Oct. 7, 1941.  C. M. BOSWORTH  2,257,729
AUTOMATIC LATHE
Original Filed Dec. 13, 1934    15 Sheets-Sheet 3

INVENTOR.
Cyrus M. Bosworth

Oct. 7, 1941.   C. M. BOSWORTH   2,257,729
AUTOMATIC LATHE
Original Filed Dec. 13, 1934    15 Sheets-Sheet 4

INVENTOR.
Cyrus M. Bosworth

Oct. 7, 1941.  C. M. BOSWORTH  2,257,729
AUTOMATIC LATHE
Original Filed Dec. 13, 1934   15 Sheets-Sheet 6

INVENTOR.
Cyrus M. Bosworth

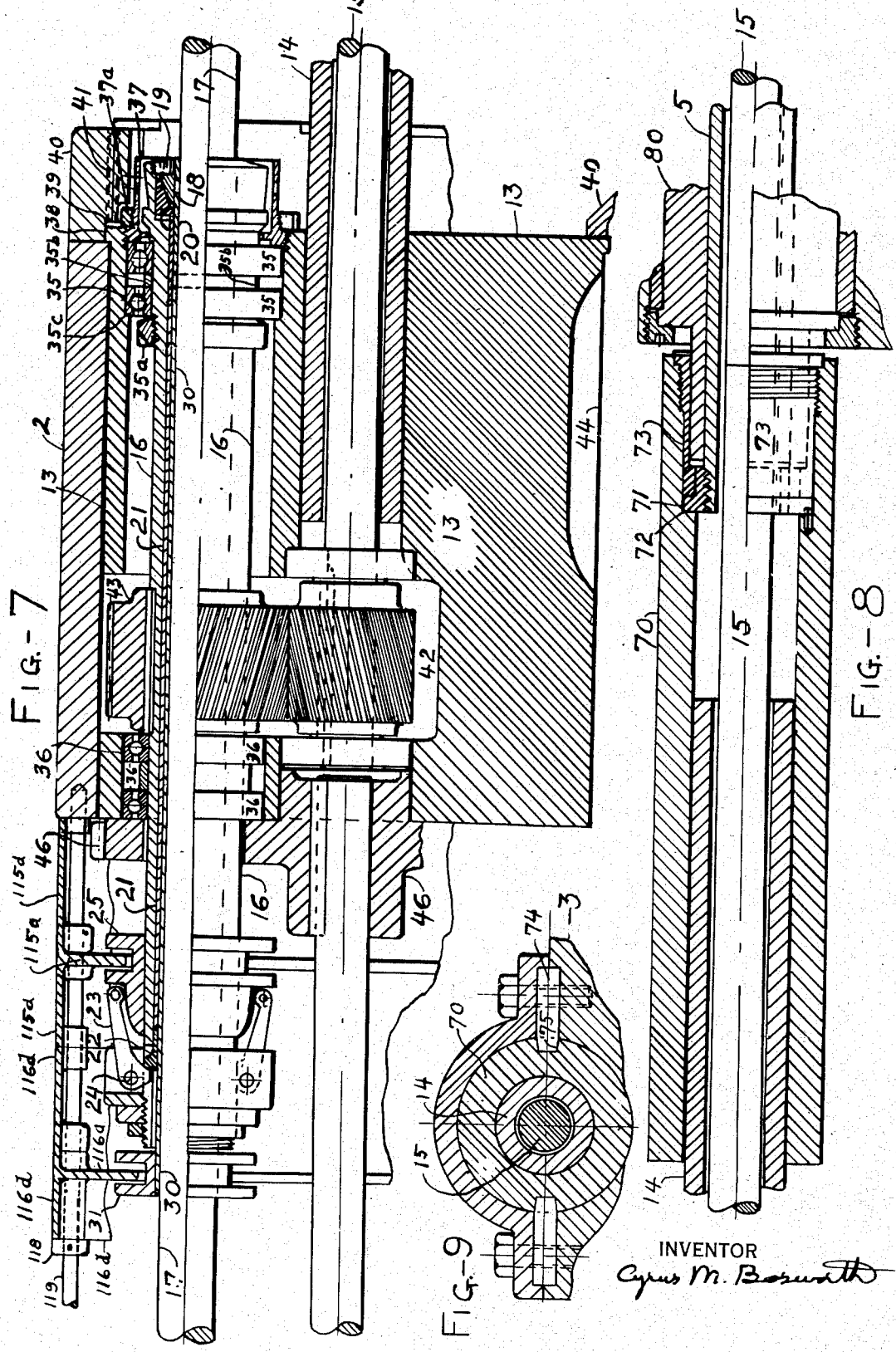

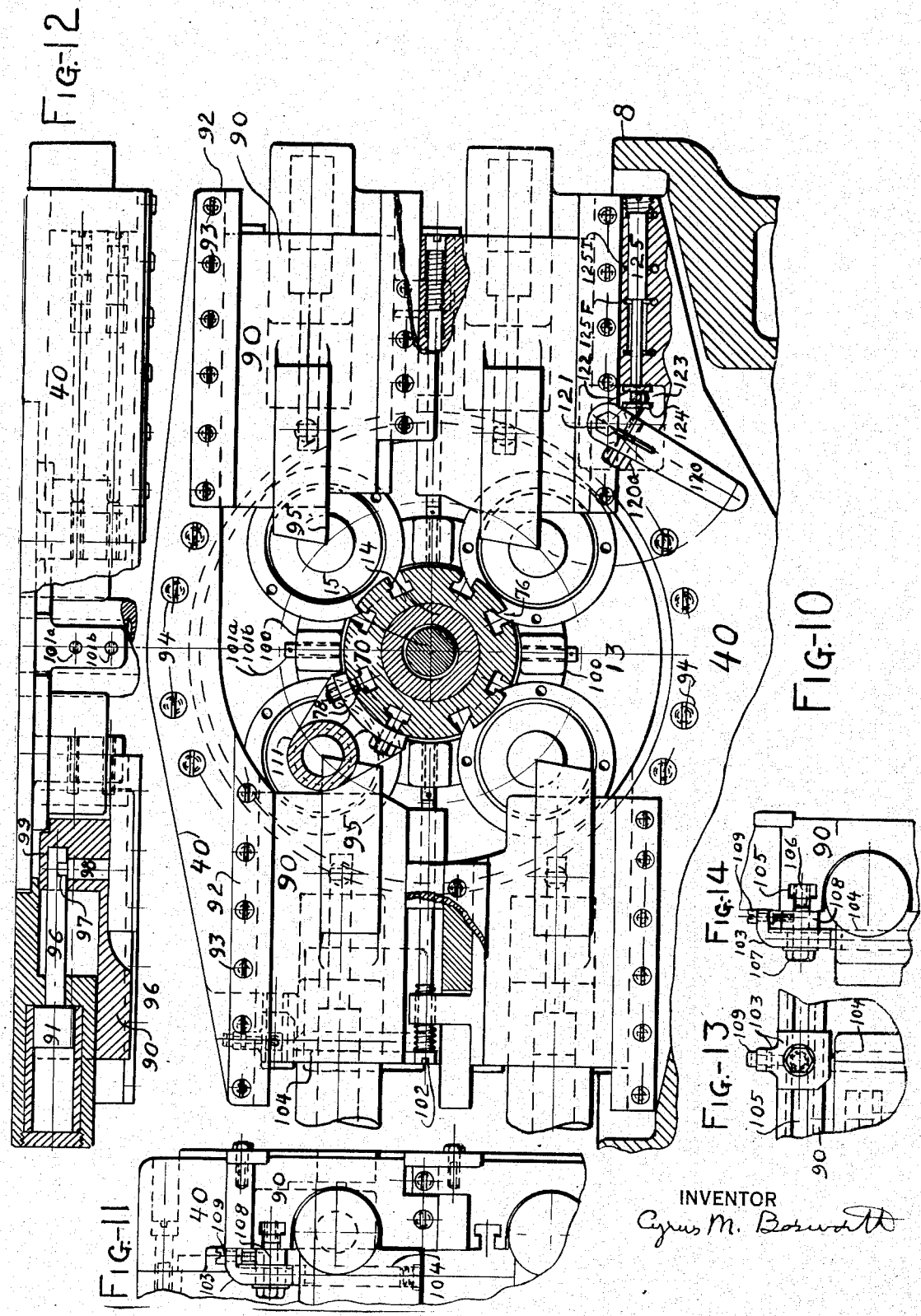

Oct. 7, 1941.　　　C. M. BOSWORTH　　　2,257,729

AUTOMATIC LATHE

Original Filed Dec. 13, 1934　　　15 Sheets-Sheet 9

INVENTOR
Cyrus M. Bosworth

Oct. 7, 1941.  C. M. BOSWORTH  2,257,729
AUTOMATIC LATHE
Original Filed Dec. 13, 1934  15 Sheets-Sheet 11

INVENTOR
Cyrus M. Bosworth

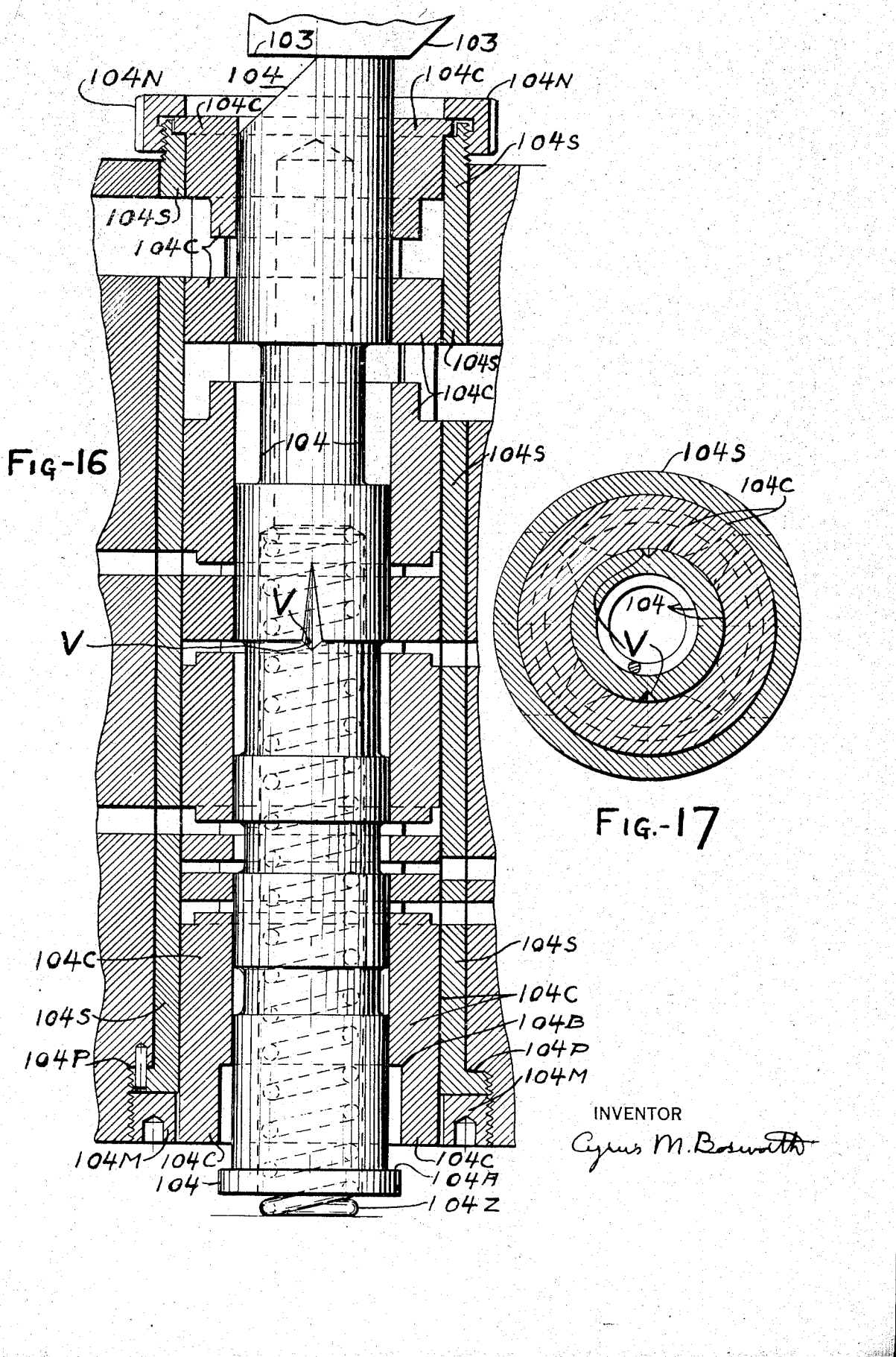

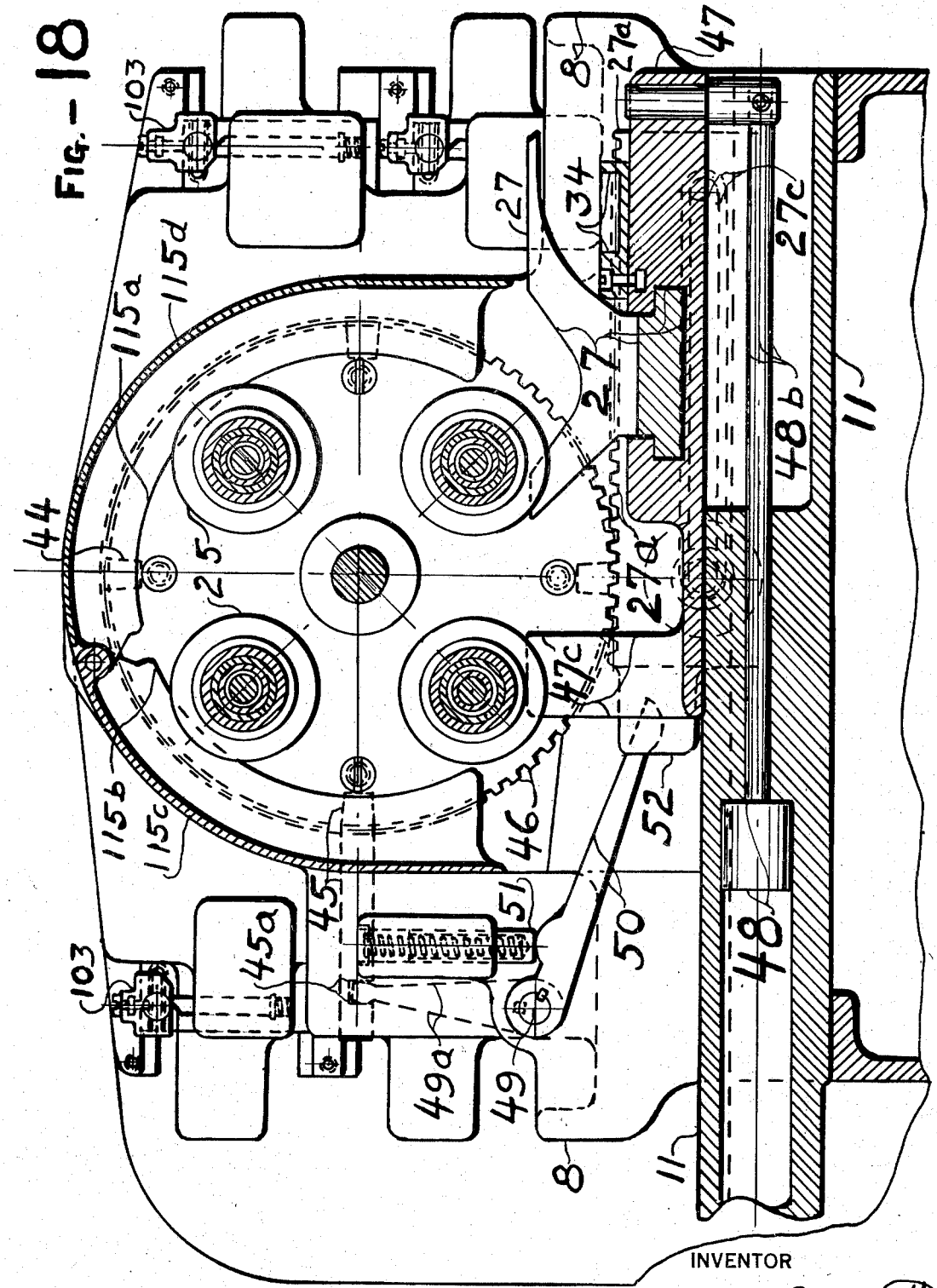

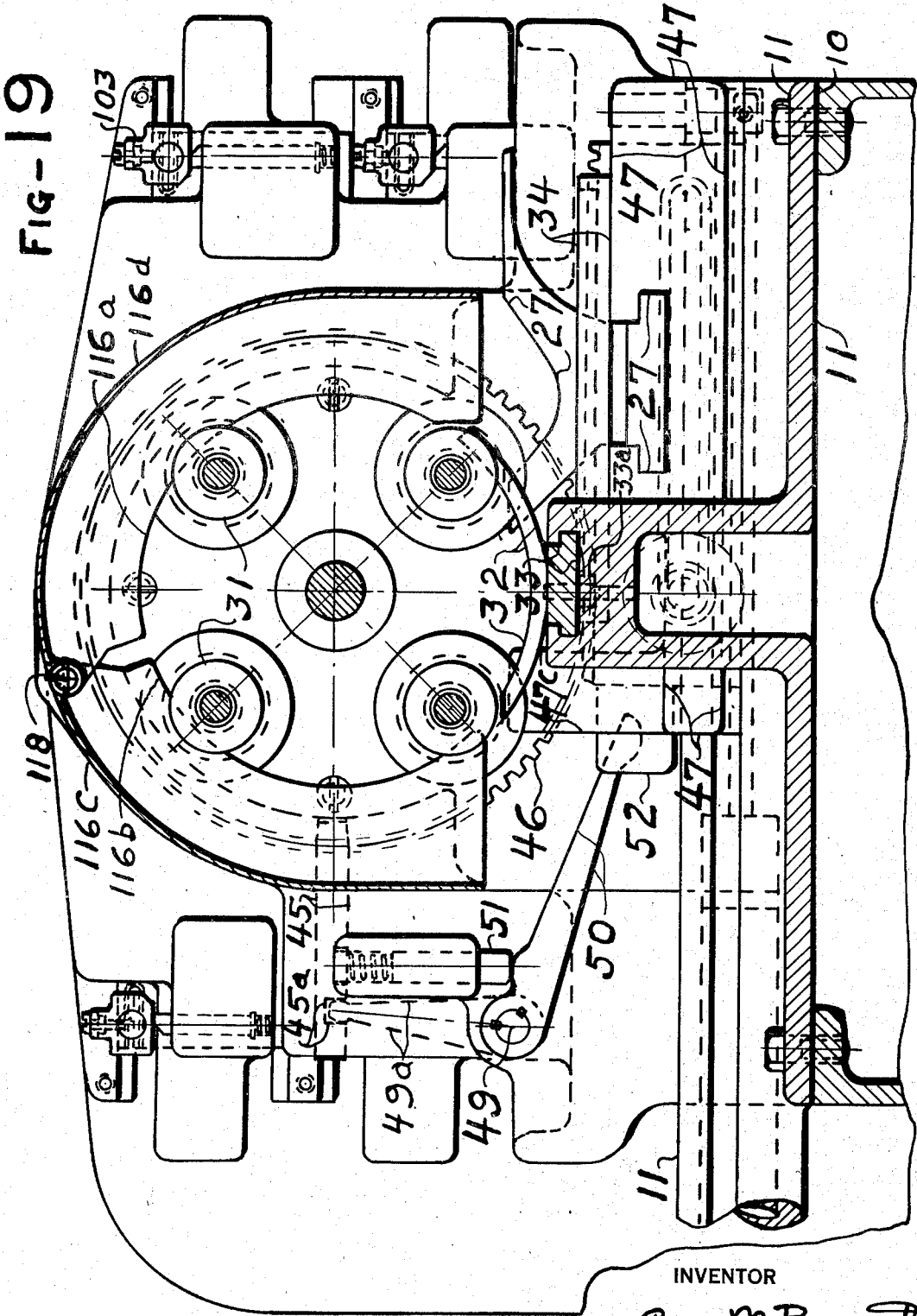

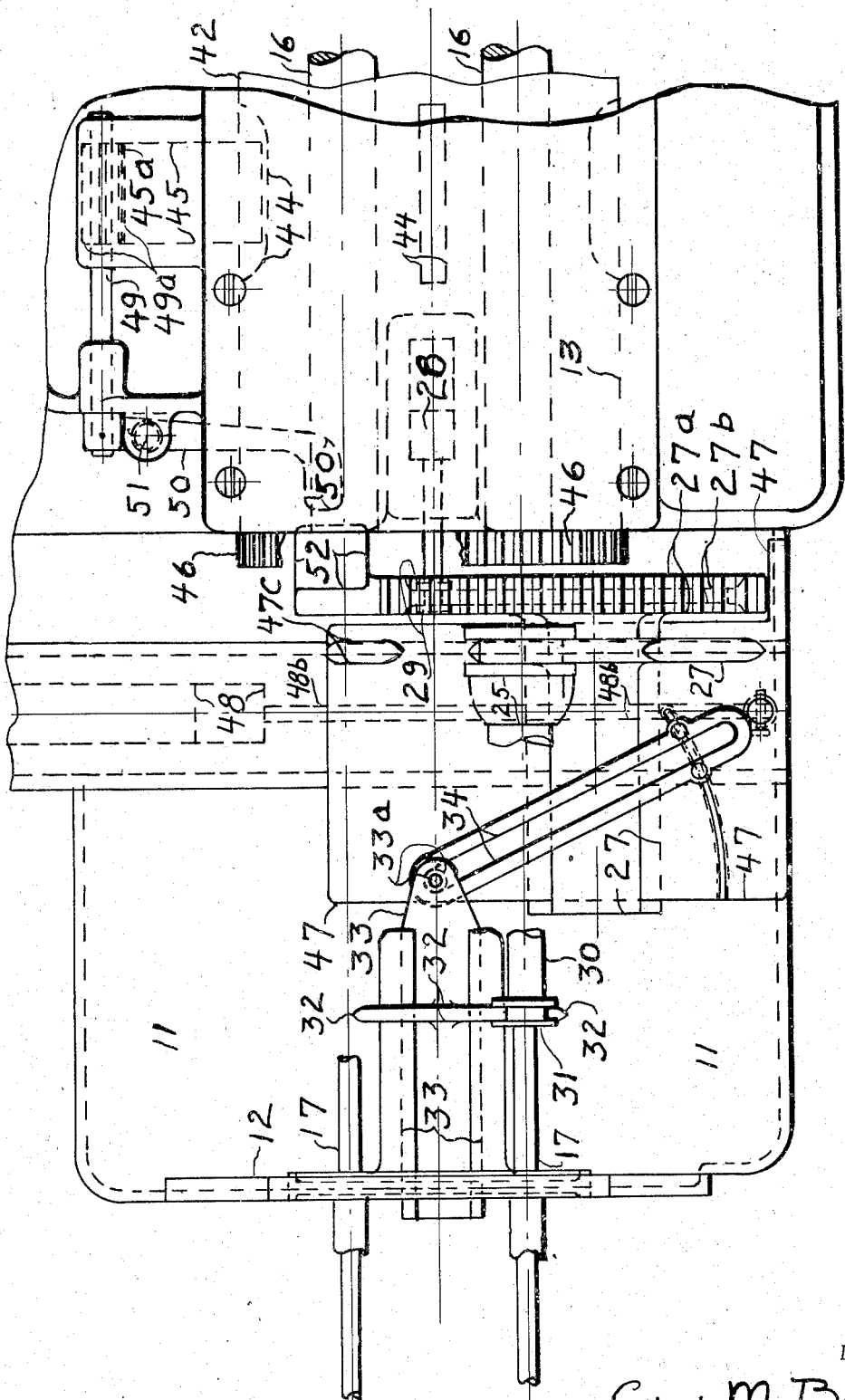

Patented Oct. 7, 1941

2,257,729

UNITED STATES PATENT OFFICE 2,257,729

AUTOMATIC LATHE

Cyrus Milburn Bosworth, Rochester, N. Y.

Application December 13, 1934, Serial No. 757,316
Renewed June 25, 1940

32 Claims. (Cl. 29—37)

This invention relates to automatic lathes used for machining metal parts from bar stock, and known to the trade as hydraulically operated automatic screw machines.

The object of the invention is to provide an improved machine of this class.

One object of the invention is to provide a hydraulic control in which all the movable parts are so interlocked that they will synchronize and thus avoid interference with one another.

Another object of the invention is to provide an accurate control for the automatic return of the slides after they have finished forming to desired diameters and lengths. This control will also provide for adjustment to compensate for inaccuracies in the various spindles.

A further object is to provide an automatic lathe of novel construction having less parts, smoother and faster action and greater rigidity.

Another object is to provide a rigid and simple cross slide construction.

A further object is to provide a new type of tool slide and an improved method for its support.

Another object is to provide a simple method of hydraulically indexing the work spindle carrier, opening and closing the work spindle chuck, the feeding of the bar stock, the pulling of the work spindle carrier lock bolt and the synchronization of these actions.

A further object is to provide a rigid bed construction that will allow ample chip space, the ready removing of the chips while the machine is in operation and permit use of a small splash guard that will keep the outside of the machine dry and clean and will allow the operator to stand close to the tools; also that will provide a machine of exceptionally low height, occupying a small floor space, yet containing the driving motor within the outline of the machine.

Another object of this invention is to provide a hydraulic fluid reservoir that extends above all pipe connections or sliding joints, thus providing against siphoning of the fluid and thereby preventing air entering the circuit, which would cause damage as will be explained later.

A further object is to provide a convenient method of adjusting the length of stock to be fed out.

Another object is to provide a method of feeding the stock so that the feed tubes will not protrude out any distance from the spindle except during stock feed.

Another object is to provide a means to hold chuck and feed thimbles in their proper place when operating, these retainers being readily raised or swung out away from the feed and chuck thimbles, thus allowing all the work spindles to be stocked at one time. This will save considerable time at each loading of the machine.

A further object is to provide for the counter-clockwise rotation of the work spindle carrier so that the last operation is the cut-off position, that is in the lower front position, thereby making it easy to catch the finished work as it is cut off, placing the most troublesome tools such as taps, dies and reamers in the front of the machine where they can be seen and given attention. In fact, it will seldom be necessary to go to the rear of the machine.

Another object is to provide a swinging gage stop that is out of the way when the tools move forward and not in the path of the chips in their descent into the chip pit and the synchronization of its operation.

A further object is to provide a convenient method of mounting any auxiliary tool slide attachments, such as a threading attachment, high speed drilling and accelerated reamer in any of the tool positions without making troublesome pipe connections or without the use of a complication of shafting and gears.

Another object is to provide a stock reel indexing means which gets its power directly from the indexing mechanism and not thru the work spindle carrier, and its flexible drive so that stock reel need not be exactly in line with work spindle carrier.

Another object is to provide a work spindle mounting and also a work spindle carrier mounting in which all the end thrusts in either direction for both work spindles and work spindle carrier is taken close to the tools, thus eliminating variation in length of the work due to difference in temperature of the spindle head parts.

A further object is to provide a throttle valve that will vary its opening or throttling effect with any change in fluid temperatures so as to keep the feed rate constant when the machine is set up at a definite rate of feed.

The above and other objects will more fully appear from the following description and accompanying drawings and will be especially pointed out in the appended claims.

In the accompanying drawings and forming parts of the specifications:

Fig. 7 is an enlarged section through work spindle carrier and through one work spindle showing method of taking thrust of work spindle and work spindle carrier. The lower half of section is one through work turret between work spindles.

Fig. 8 is an enlarged vertical section through the main slide showing the connection of tool slide to tool slide piston.

Fig. 9 is an enlarged section through main tool slide support showing method of retaining slide and preventing its rotation.

Fig. 10 is an enlarged section taken on line 10—10 in Fig. 1 showing arrangement of cross slides and their stops, the shape of the tool slide or main slide and the method of holding main slide tools and the gage stop mechanism.

Fig. 11 is an enlarged front elevation of one of the cross slides showing its throttle valve.

Fig. 12 is an enlarged top view of cross slides with one cross slide in section showing its piston.

Fig. 13 is an enlarged end view of cross slide throttle and cam.

Fig. 14 is an enlarged front elevation of throttle mechanism.

Figure 15:
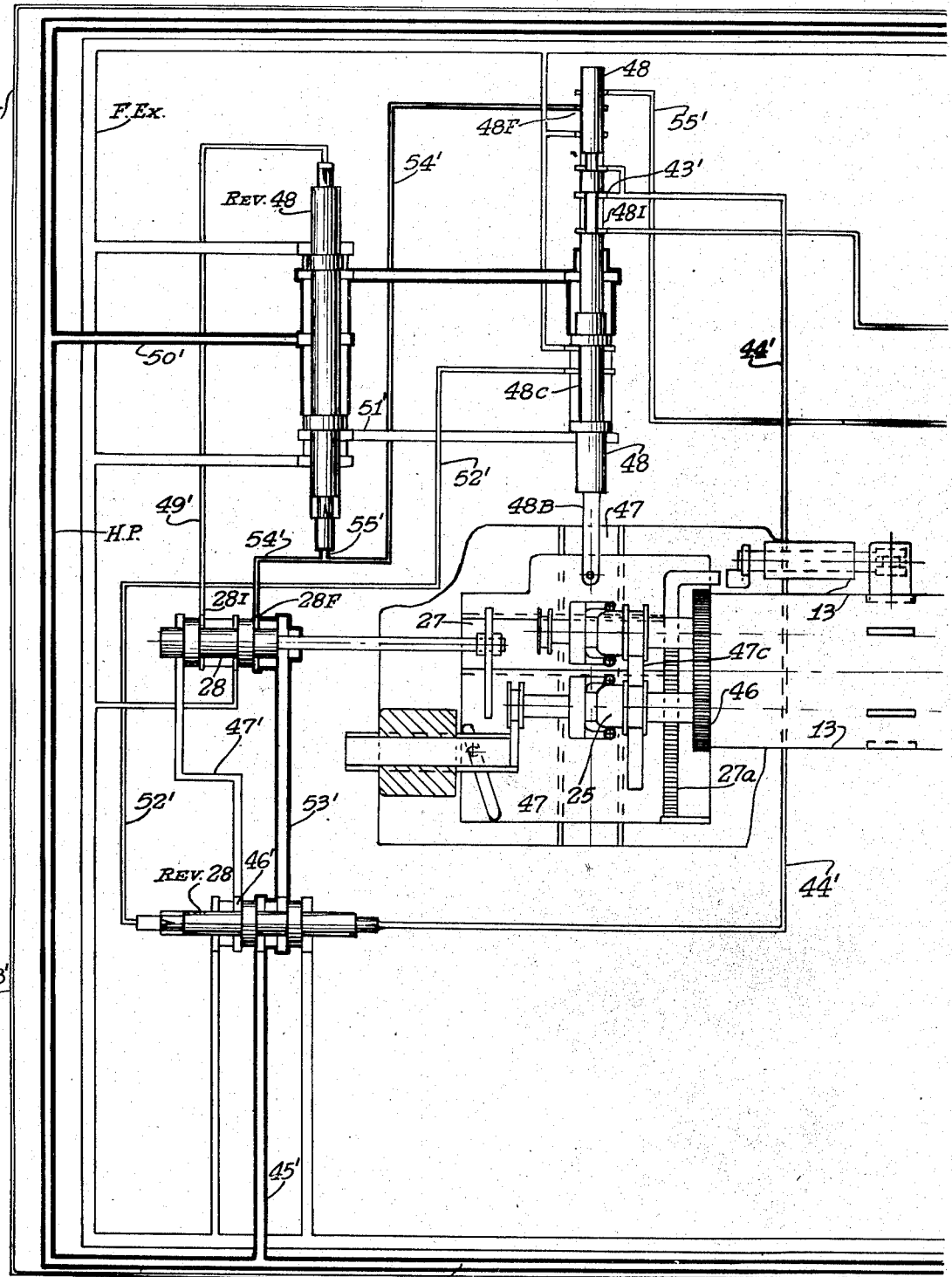
Figure 15A:
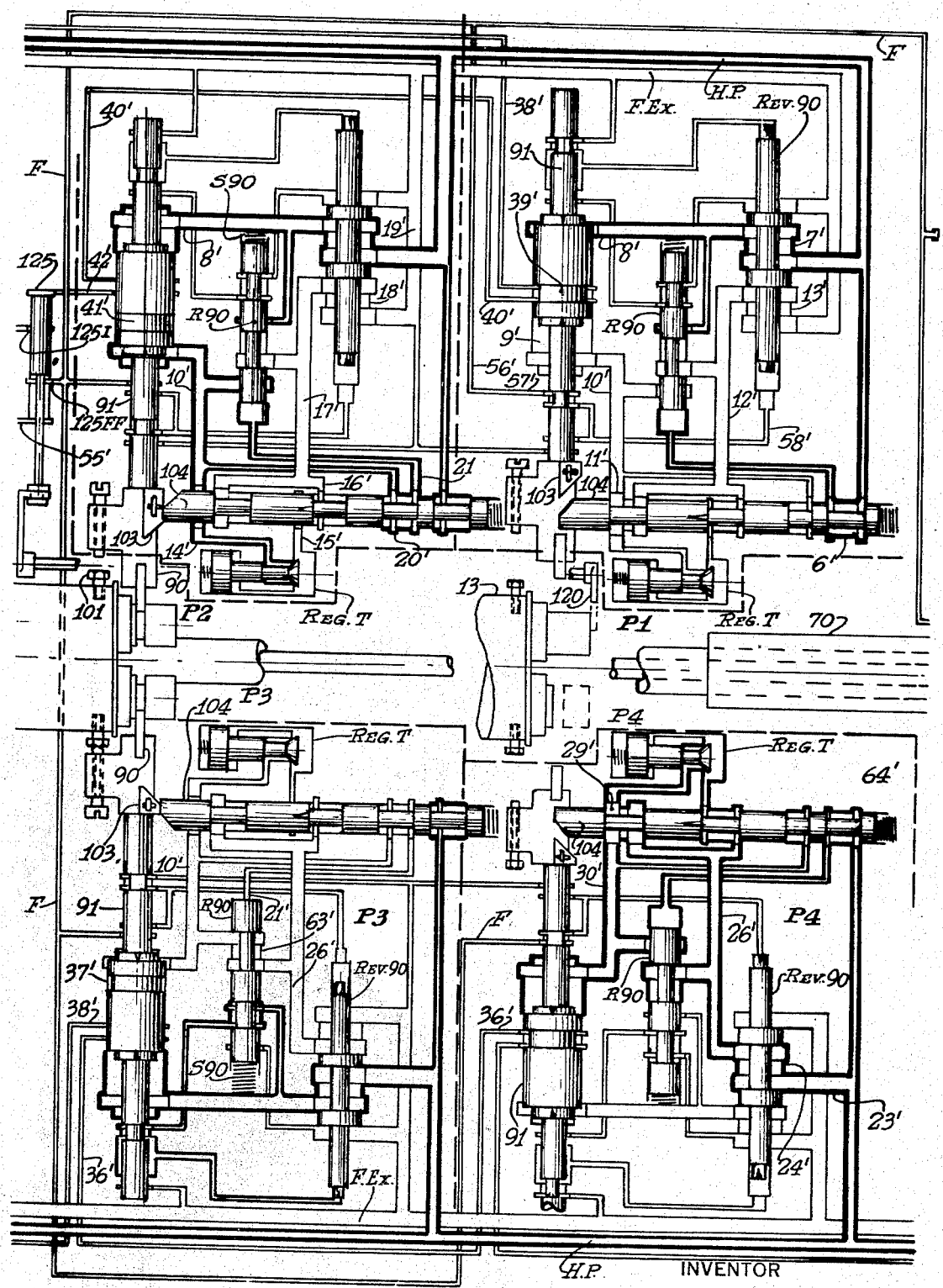
Figure 15B:
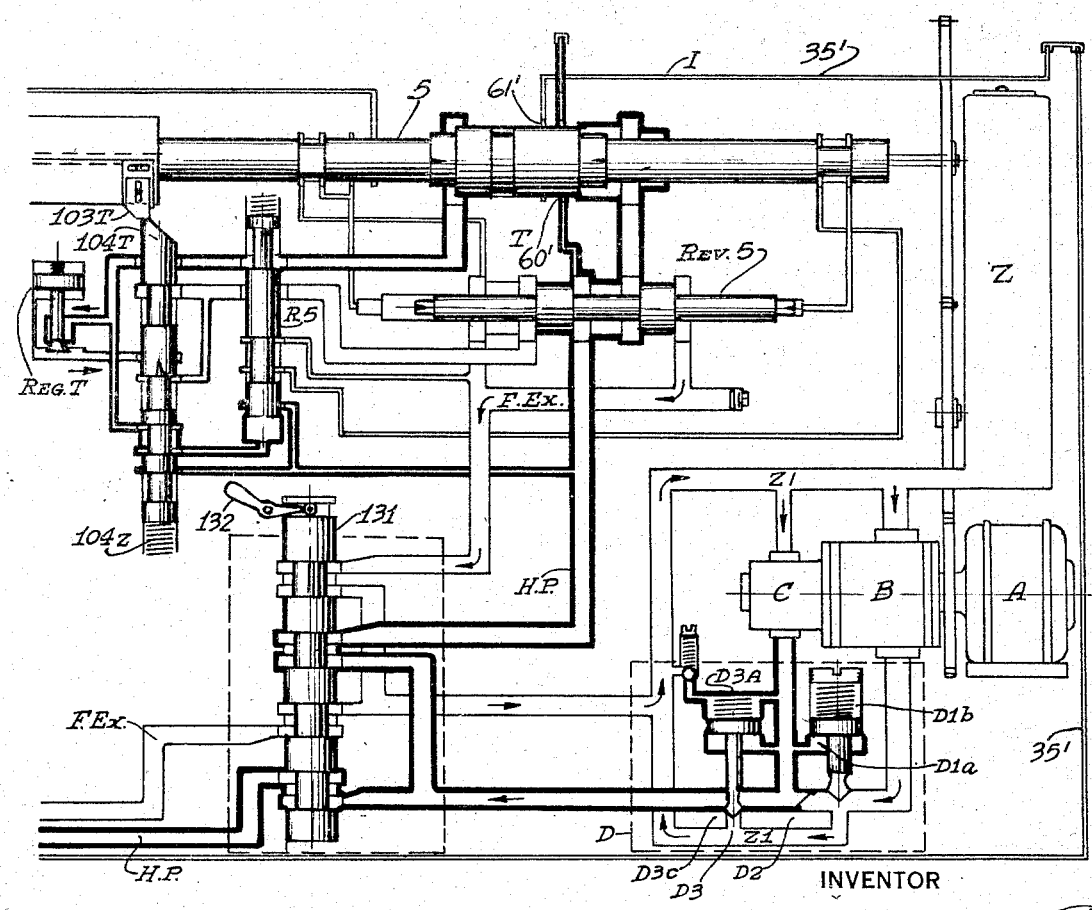

Figs. 15, 15A and 15B comprise the hydraulic circuit diagram showing how the parts are made to synchronize, the method of control of the feed, rapid traverse and reverse of the slides, the hydraulic index, stock feed chucking mechanism and swinging gage stop.

Fig. 16 is an enlarged section of the throttle valves.

Fig. 17 is an enlarged cross section at right angles to the axis and through the throttle portion of the throttle valves.

Fig. 18 is an enlarged vertical section through the index piston showing index gear, wedge pulling and chucking mechanism and chuck thimble retaining guards.

Fig. 19 is an enlarged vertical section through the stock feed slide showing stock feed shoe, slide and cam, and stock feed thimble retaining guards.

Fig. 20 is an enlarged plan view of indexing, wedge operating, chuck operating and stock feeding mechanisms.

Briefly the invention includes a rotatable intermittently operated work spindle carrier cylinder, shown in the present instance carrying four work spindles and hydraulic means for indexing it intermittently, and an end working main tool slide movable axially towards and away from the work turret, and hydraulic means for operating it, together with cross slides and swinging gage stop and hydraulic means for operating them and means for interlocking all parts so that they will synchronize.

It will be seen by referring to the drawings that a large multiplicity of cams, levers, gears, clutches and shafts ordinarily used in this type of machine have been eliminated. In a hydraulically operated machine it is a simple matter to synchronize the starting of the several slides at any determined time by having their respective valves operated by cams located on a common cam shaft, or cams on one of the slides, but it is very difficult to control the time when they will finish their work and return, this time being dependent on the rate of feed of their respective slides, so unless the time of indexing the turret and/or the feeding of the stock and the starting of all slides is not controlled by the return of each and every slide, or in other words if all the slides are not back because of too slow a rate of feed or hard spots in the material or dull tools, then there will be interference and damage to the machine and tools.

This invention provides for such interlocking that the turret cannot index until all tools are back, and also that no tool can go forward again until the index is completed. The index includes the opening and closing of the chuck, the feeding and the gaging of the stock. After the work turret is indexed and the gage stop swung out of the way, all tools start forward in rapid traverse until the tools are close to the work, at which time the speed drops to the desired rate of feed for each tool slide, continuing until the end of the stroke, where they dwell until exact dimensions are reached on the work and then individually trip into rapid traverse in the reverse direction and return to the starting position, where they wait until all the other slides are back.

When the last slide is back, then the gage stop will swing up and the chuck in lower front position will open and the turret will index. During index the stock will feed out against swinging gage stop. After the index is completed and the chuck is closed, the gage stop is moved out of the way, and then all the tool slides move forward.

It is thus seen that all hydraulic elements are interlocked so that if one element fails to function due to any cause, then all elements will stop until interference is removed.

The machine in which the above described interlocking means is used together with many other important improvements comprises a bed casting 1 of a box section, Figs. 1, 2, 3, 4, 5 and 6, on the top of which are cast integral with it three bearings.

The largest bearing located at the left end with the cap 2 is a bearing housing for work spindle carrier. The smaller bearing and cap 3 located to the right of the center of the bed is a bearing housing for the tool slide and main slide. The bearing 4 with no cap, located at extreme right, is a housing for the main slide piston 5. All three bearings being integral with bed, are bored in line in one setting thus insuring perfect and permanent alignment at low cost. The caps 2 and 3 are used to facilitate the fitting and assembling.

Figure 2:
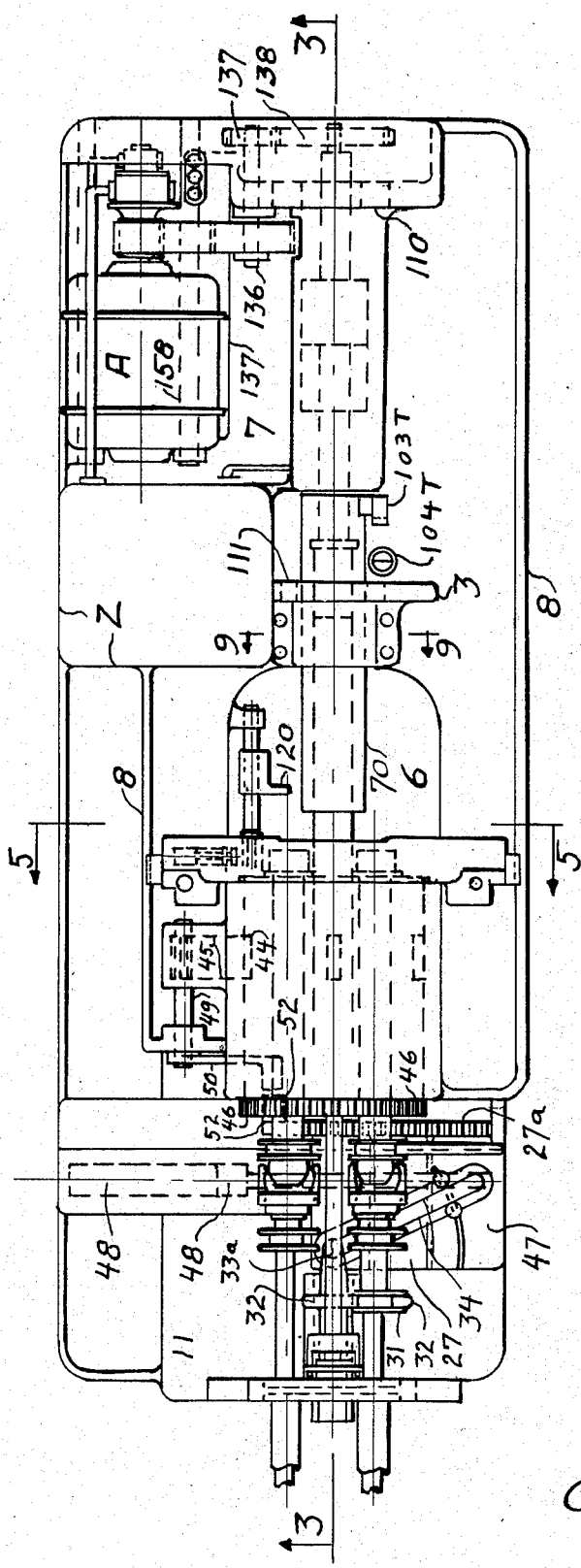
Fig. 2 is a plan view of the same, with spindle guard removed.
Figure 5:
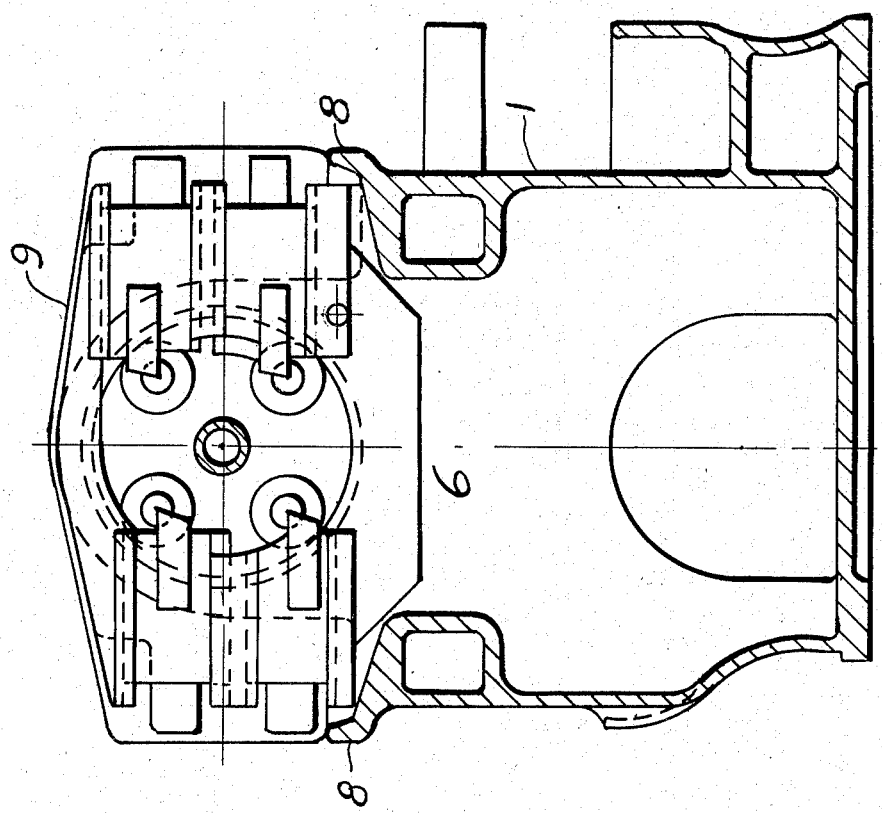
Fig. 5 is a vertical cross section on the line indicated at 5—5 in Fig. 1 through the main slide looking in the direction of arrows showing bed construction.
Figure 6:
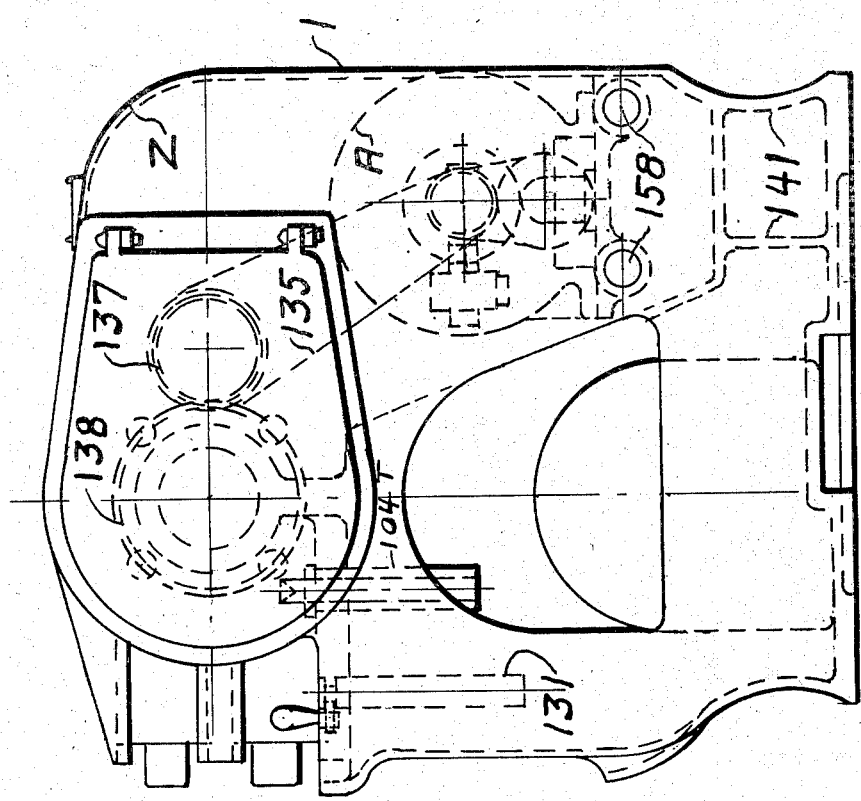
Fig. 6 is a right end elevation showing method of mounting motor, fluid pumps and method of drive to change gears for driving work spindles.

There is a large opening 6, Figs. 2 and 5, in the top of the bed between the turret bearings and the main slide for the passage of chips to the inside of the bed, and openings in front, rear and at both ends for the removal of the chips.

Figure 3:
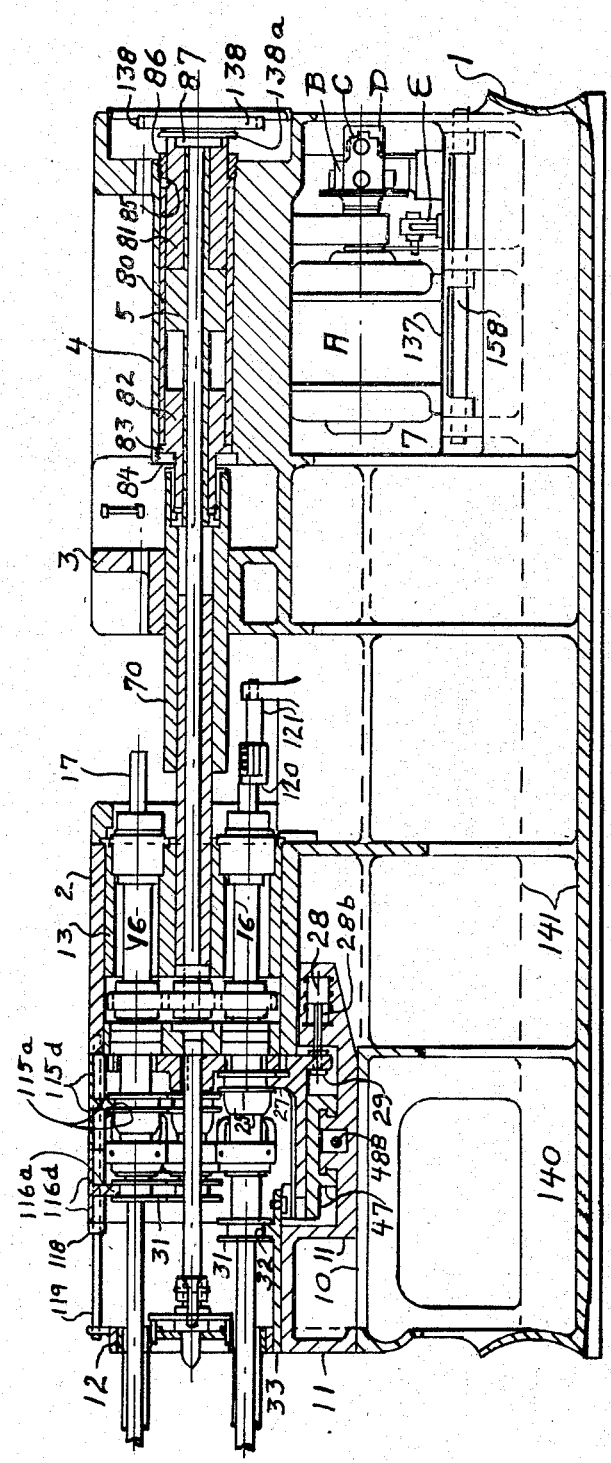
Fig. 3 is a vertical longitudinal section through the center line of the machine and work spindle carrier, showing all parts in their respective proper positions during the indexing of the work turret.

There is also a large opening 7, Figs. 2 and 3, in the rear at the right end of bed for convenience of piping up the machine, and for mounting the motor and pumps. In addition, there is a small wall or bead 8, Figs. 2 and 5, on the upper edge of bed on each side of the work turret housing, which in conjunction with a small guard 9 keeps the oil and chips on the inside of the machine and thereby keeping the outside of the machine clean.

Figure 1:
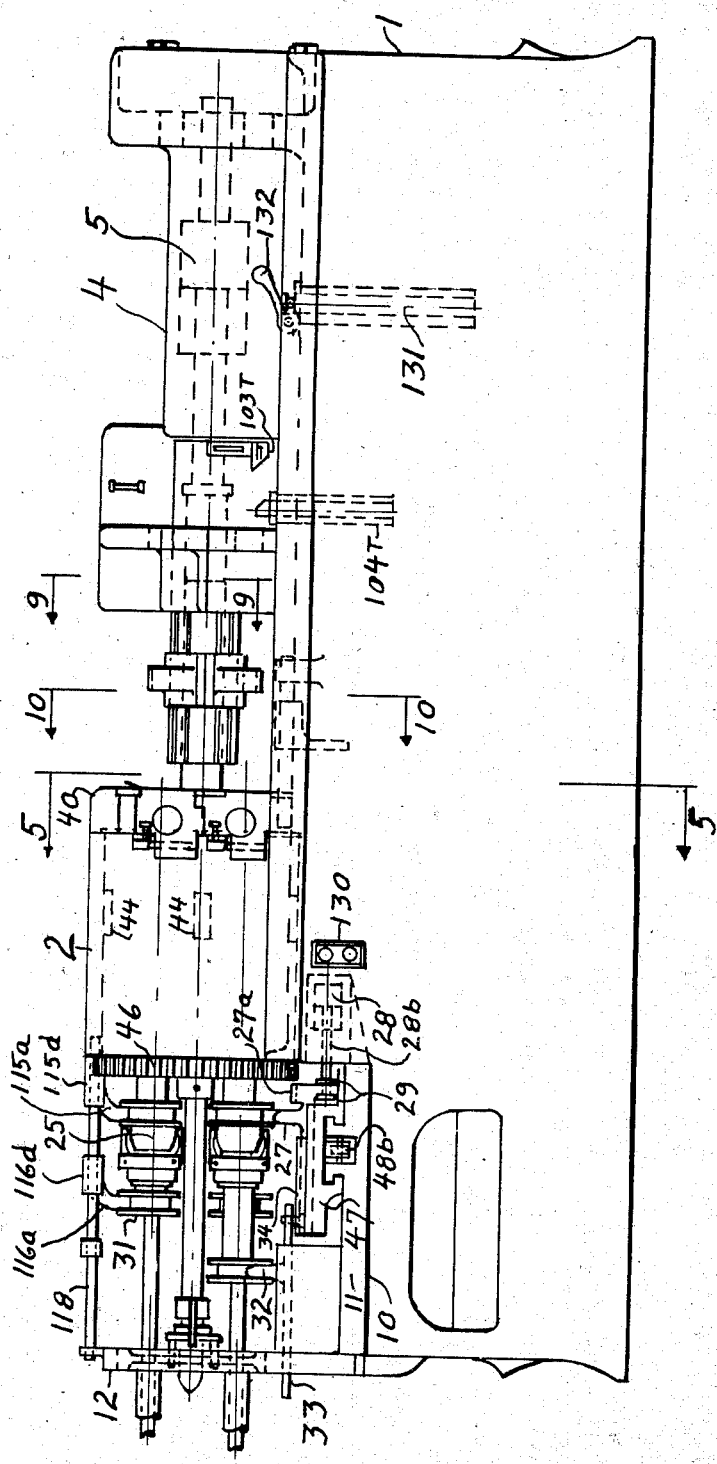
Fig. 1 is a front elevation of the hydraulically operated multiple spindle screw machine.

The extreme left end of the bed, Fig. 1, has a flat machined surface 10 which holds the base 11 for the indexing stock feed and chuck operating mechanisms (see Figs. 1 and 3) and also on which is mounted the stock reel support 12.

The work spindle carrier or work turret 13, Fig. 7, is located in housing 2 for intermittent rotation and indexing, and is bored centrally and axially for the reception of the tool slide supporting sleeve 14. This sleeve is held fast and is part of the work spindle carrier extending into the bearing of the tool slide. This sleeve is bored centrally to receive a work spindle driving shaft 15, which is driven by a motor A, Figs. 2 and 3, located in the rear right end of the bed, through change gears as will be explained later. The central bore of the work spindle carrier is also bored for bearings for the spindle driving shaft. Within the work spindle carrier are also several holes bored parallel with the central bore and the center line of the work spindle carrier and at equal distance from each other for the housing of the work spindles 16, four of which are shown in this illustration.

The work spindles are of somewhat standard design, the bar of stock 17, Fig. 7, being held by push-out chuck 18 which is held against nut 19 threaded in the work spindle. The chuck is made to grip by having its cone surface telescoped by the pusher 20 which is pushed in turn by push tube 21. This tube is pushed forward by thrust collar 22 which in turn is pushed by the chuck fingers 23 which are pivoted at 24. The outer ends of the fingers are forced up on the larger diameter of chuck thimble 25 when the bar is chucked from lower front to lower rear position. The chuck thimbles are held in this position except when chuck is open for feeding stock by the front and rear sections 115$^a$ and 115$^b$ respectively of a retainer ring, which sections are integral with guards 115$^d$ and 115$^c$ respectively, there being four guards. 115$^d$ is in the front and 115$^c$ in the rear. Both are around the chuck thimbles, as shown in Fig. 18.

Guard 116$^d$ is in front and 116$^c$ is in the rear and both are around the feed thimble, as shown by Fig. 19. Shoe 47$^c$ which is integral with index slide 47 also retains chuck thimbles in lower rear position.

Figure 4:
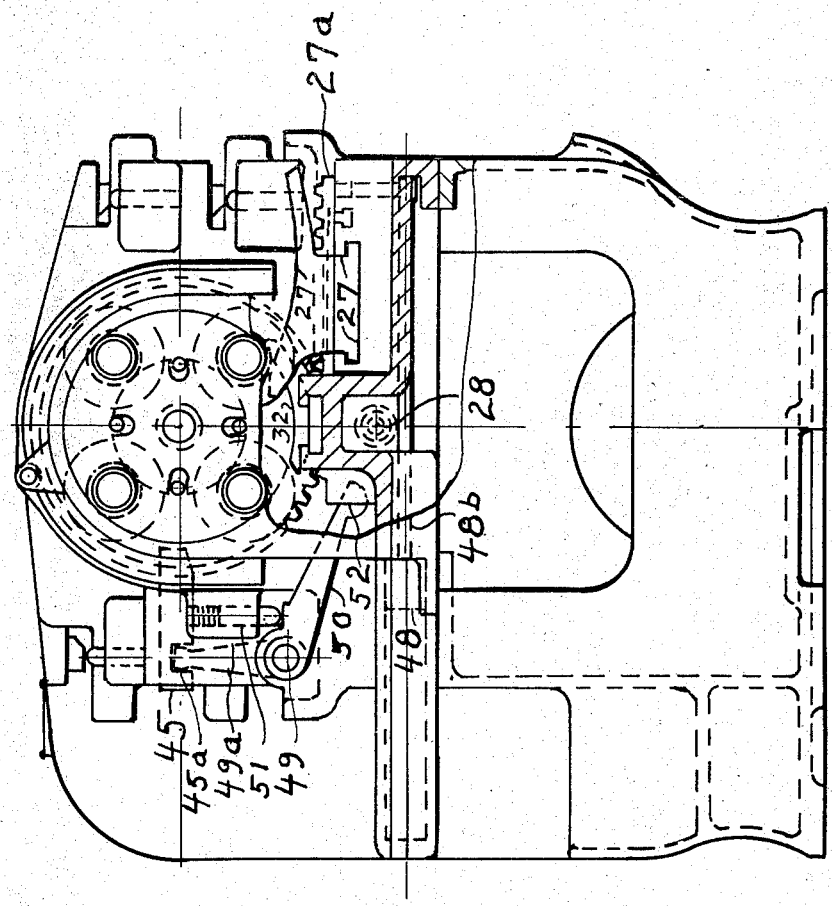
Fig. 4 is a left end elevation, in which part of end of machine is removed to show the indexing mechanism, stock feed shoe slide, chuck operating shoe slide and lock bolt operating mechanism.

The chuck thimble is actuated by chuck shoe which is integral with chuck slide 27, Figs. 4 and 18, which is in turn actuated by chuck piston 28, Figs. 3, 4, 19 and 20. The chuck piston rod has two collars 29 fastened securely to its outer end. These collars 29 straddle a cross extension 27$^b$ which is integral with chuck slide 27, the rod extending through an elongated slot 27$^c$, Figs. 4 and 18. The hydraulic action of the chuck piston causes the chuck slide to move longitudinally of the machine and the work to be chucked. The timing of this action will be described in connection with the explanation of the index mechanism with which it is interconnected.

The stock is fed in the work spindles by a standard constructed feed tube 30, Fig. 7, and feed thimble 31, but the feed tube and thimbles are held in the forward or in toward the machine position by a segment of a ring retainer 116$^a$ and 116$^b$ located also on guard 116$^c$ and 116$^d$ except during the return of the stock feed tube and during the actual stock feeding which takes place during index. The timing of these actions of the feeding stock will also be described in connection with the indexing with which it is also interconnected. Suffice to say at this time that the stock feed thimble 31 is actuated by stock feed thimble shoe 32, Figs. 1, 2, 3, 19 and 20, which is integral with stock feed slide 33, Figs. 2, 3, 19 and 20, which is moved longitudinally of the machine by the adjustable cam 34, Figs. 2, 19 and 20, during the index of the work turret 13.

The work spindles 16, Fig. 7, are mounted in ball bearings 35 and 36 which in turn are mounted in the work spindle carrier. The front spindle bearings 35 take all the end thrusts in either direction, the rear spindle bearings 36 take only radial load and are free to float. The front bearing set have their inner races clamped tightly to the spindle by means of the spindle nut 35$^a$ and a spacer tube 35$^b$. The outer races of bearing 35 fit against the shoulder 35$^c$ in the work spindle carrier. An adjusting nut 37 threaded in to work spindle carrier takes up the play in the front spindle bearings and serves as a splash guard around nose of spindle. A lock nut 37$^a$ prevents the loosening of the adjusting nut. The above construction avoids variation in the length of work due to the change of length of spindles caused by expansion due to temperature rise.

The work spindle carrier is restrained from end motion by means of a flange 38 at the tool end of the cylinder. This flange bears against work spindle carrier housing 2. The thrust from end working tools such as drills will be taken against this housing, any end play and thrust in the opposite direction is taken by brass shoes 39 located between the flange and cross slide housing 40. These shoes are held up against the flange on work spindle carrier by means of screws 41, Fig. 7. This construction will safeguard against unequal expansion of work spindle carrier and work spindle carrier bearing.

The work spindle carrier has recesses 42 to allow for the work spindle driving gears 43 and splines 44 on the periphery for the entering of lock bolt 45, Figs. 2, 4 and 18. The indexing of the work spindle carrier, the operation of the chuck mechanism, the feeding of the stock are all interlocked mechanically and hydraulically.

The hydraulic action will be described in the explanation of the hydraulic circuit diagram.

On the left face of the work spindle carrier is rigidly and concentrically fastened an indexing gear 46. On the chuck operating slide 27, Figs. 3 and 20, is a rack 27$^a$ integral therewith. This chuck operating slide and rack have a longitudinal motion that is lengthwise of the machine in ways that are integral with and in the indexing slide 47, Figs. 1, 2, 3, 4, 18, 19 and 20. This indexing slide has a cross motion that is from the front to the rear of the machine in ways in the index base 11 and receives its action through the piston rod 48$^b$ from the indexing piston 48 which is housed in the indexing base 11. When all the tool slides are back ready for indexing the turret, the chuck operating piston 28 gets fluid under pressure which causes it to move to the right, causing the chuck slide 27 to move to the right, thereby opening the chuck and also causing the index rack 27$^a$ to move to the right, entering into mesh with indexing gear 46. When chuck piston 28 has finished this stroke, a port in its cylinder wall is thereby opened, allowing the fluid under pressure to flow to in front of piston 48, causing the index piston to move back, taking the index slide 47 with it and also the chuck operating slide 27, which is mounted on index slide and which in turn carries the index rack 27ᵃ. The work spindle carrier is thereby indexed. At the finish of the index stroke a port is opened in the cylinder wall of the index piston 48 and fluid under pressure is allowed to flow back to the right side of the chuck piston 28. The chuck piston then moves to the left sliding chuck thimble 25 to the right, thereby closing the chuck and also removing index rack 27ᵃ from index gear 46.

When this stroke is completed, the fluid under pressure is allowed to flow to swinging gage stop, then to all the cross and turret tool slides and also back to the other end of index piston 48 where it causes the index piston to move towards the front of the machine, ready for the next index, this forward motion of index slides taking place while tool slides are on their forward stroke.

The stock feed has also taken place during this index. Mounted on the index slide 47 and moving with it is a stock feeding track cam 34 (see Figs. 1, 2, 3, 4, 18, 19 and 20). The stock feed slide 33, Figs. 1, 2, 3, 4, 19 and 20, is mounted in ways on the index support 11 and has a longitudinal motion only. A roll 33ᵃ on the stock feed cam is always in engagement with this cam 34. So the back and forth motion across the machine of the index slide 47 causes a longitudinal motion of the stock feed slide and stock feed shoe 32, Figs. 1, 2, 3, 4, 19 and 20, which shoe is integral with stock feed slide 33, Figs. 19 and 20. Hence, when the index slide is on the indexing stroke or towards the rear of the machine, the stock feed shoe will push stock feed tube into the spindle and the stock will be fed. At end of index as explained before, the stock is chucked so the return of index slide will return the stock feed slide and will pull the stock feed thimble 31 and stock feed fingers over the stock in spindle in lower front position. Then the stock feed mechanism will be ready for the next stock feeding.

The above mechanism will by the nature of hydraulics give a gradual acceleration to the indexing of the turret as well as a gradual acceleration to the feeding of the stock, both of which are important.

The gradual deceleration of the turret and the deceleration of the feeding of stock is taken care of by the placing of fluid cushions in the hydraulic circuit as shown on the hydraulic circuit, Figs. 15, 15A and 15B. The above indexing of turret, the feeding of the stock and chucking will be very rapid. If stock is oversize or other imperfection of stock occurs, there will be no excess strain and the machine will stop.

The work spindle carrier lock bolt mechanism also is operated by the indexing mechanism. As explained before, the work spindle carrier has splines in its periphery in which enters a lock bolt 45, Figs. 2, 4, 18, 19 and 20. This lock bolt has a cross groove 45ᵃ in which the lock bolt is engaged by a lever 49ᵃ which is keyed to a shaft 49. At the left end of the shaft is keyed another lever 50 which is always in contact with spring plunger 51. This lever is engaged by a cam 52 which is integral with the index rack 27ᵃ and chuck slide 27. The motion of the chuck slide 27 which moves the index rack 27ᵃ into mesh with the index gear 46 also moves the cam 52 into engagement with lock bolt lever 50 and pulls the wedge ready for indexing.

As the work spindle carrier is indexed, the spline 44, Fig. 18, moves away from the lock bolt and at the same time the cam 52 on index rack moves away from lock bolt lever 50, allowing lock bolt 45 to return, but the spline 44 has moved away so the lock bolt on its return cannot enter spline but comes to rest on the periphery of the work spindle carrier.

As the index is completed, the lock bolt actuated by the spring plunger 51 will snap into the next spline 44. There will be no shock to the work carrier as the index motion is gradually decelerated. At the end of index as explained before, the index rack leaves the index gear and hence on the return motion the index rack and cam 52 will not contact the lock bolt lever 50.

The main tool slide 70, Fig. 9, is of cylindrical form, which form can be machined accurately and is supported both by the work spindle carrier sleeve 14 and the bed bearing housing 3 and is moved axially by means of the tool slide piston 5 through the thrust washer 71, Fig. 8. This thrust washer 71 is tapped to receive the tool slide piston 5. This thrust washer is held against the shoulder 72 in the tool slide by a nut 73 screwed in right end of tool slide. This construction eliminates the necessity of perfect alignment between tool slide and tool slide piston, because the circumference of washer 72 does not bear on bore of slide 70.

The tool slide 70, Fig. 9, is restrained from any rotation by means of two large keys or wedges 74 fastened in tool slide bearing housing 3 and bearing in longitudinal splines 75 milled parallel with axis of tool slide on periphery of tool slide. The front or left end of tool slide has also on its periphery for each tool two T-slots 76, Fig. 10, milled parallel with the axis of the tool slide for mounting the tool holder. In the tool holder 111 there is a key 78 that fits into T-slot 76 to keep holder in alignment. The tool slide is bored to receive the work spindle carrier sleeve 14 and the work spindle driving shaft 15.

The piston 5, Fig. 3, is slidable in its cylinder which is a sleeve 80 which is lapped for a fluid tight fit with piston 5 and ground to make a fluid tight fit with the lapped bore in housing 4. The bore in cylinder sleeve 80, Fig. 3, is continued all the way through. In this bore at each end are cylinder ends 81 and 82 which fit tightly in the bore of the cylinder and are lapped to make a fluid tight bearing for the piston rods. The left cylinder end has a flange 83 that is held against cylinder sleeve 80 by a nut 84 that is threaded into housing 4. The right cylinder end has also a flange 85 that is held against cylinder 80 by a nut 86 that also holds cylinder sleeve 80 from any end motion.

The right end of right cylinder end has a bored hole for drive shaft bearing 87. This construction eliminates the difficulty of grinding and lapping two different size diameters, that must be concentric in cylinder sleeve. This principle is used in the design of all pistons on the machine.

The cross slides unit, Figs. 10, 11, 12, 13 and 14, is composed of a base 40 that carries all the slides 90 and their pistons 91 and throttle valves 104 as well as their other control apparatus as shown in Fig. 15A. The piping and connections are taken care of by ports and drilled and cored holes in the housing or base 40 and in the details. The cross slides 90 are held in the housing 40 by plates 92 which are bolted to housing by screws 93.

The housing in turn is held against the work spindle carrier 2 and bed 1 by bolts 94. The tools 95 are held in suitable holders which are in turn held in grooves in cross slides. Each slide is propelled by a piston 91 through a piston rod 96 which has a milled slot 97 into which is fitted a pin 98, the end of which is machined to fit the slot in the piston rod 96.

The piston rod fits in a hole 99 in the cross slide 90 so that it will not spring. The pin 98 is fitted securely into the cross slide. The movement of the piston therefore causes a movement of the cross slide.

On the work spindle carrier 13 are cast integral lugs 100, one for each spindle, into each of which are threaded radially two cross slide stop screws 101$^a$ and 101$^b$, one for the lower front and upper rear and the other for the upper front and lower rear cross slides. These screws stop the forward or cutting motion of the cross slides and are adjustable to compensate for variation in the location of the several spindles. On each cross slide is a long stop screw 102 that engages with one of the stop screws 101$^a$ and 101$^b$. This limits the forward motion of the cross slides, serving for a micrometer stop for obtaining accurate diameters, as is readily understood. Also the limiting of the forward motion causes a decrease in the hydraulic pressure at the right end of cross slide piston, causing the slides to return as will be shown fully in the explanation of the hydraulic circuit.

The cross slides move forward into rapid traverse until the cam 103 mounted on cross slide, Figs. 11, 13 and 14, contacts with cross slide throttle valve plunger 104 which it depresses and causes the return fluid to be throttled and to flow at the feed rate. The amount of feed rate is determined by the height of the cam 103 which is adjustable up and down for rate of feed and is slidable along in T-slots 105 located in the cross slide in order to regulate the place in the forward stroke when the slide should drop into the feed rate.

Fitting into the T-slot so as not to turn is a nut 106 in which is threaded a clamp screw 107 which clamps cam 103 and sliding block 108 to cross slide. This sliding block has a tongue that fits into a vertical groove in cam 103 giving motions to cam in a vertical or horizontal direction. An adjusting collar screw 109 will give a fine up-and-down or feed adjustment to the cam.

The hydraulic cushioning of all the slides and valves at the end of both the forwarding and returning strokes is the same in principle in all cases and is merely a trap for fluid with a variable V-notch escape that is automatically diminished as the piston approaches the end of the stroke. This trap is made by having a reduced diameter on the piston that fits closely in a reduced cylinder bore. The V-notches shown on Figs. 15, 15A and 15B on all pistons are preferably made on the piston. There are two, diametrically opposite, in order that the valve will be balanced, that is that there will be equal pressures all around the piston and valves.

The feed and chuck thimbles are indexed out of and into the feed and chuck thimble retainers 115$^a$ and 115$^b$ and 116$^a$ and 116$^b$ which are integral with guards 115$^c$ and 115$^d$ and 116$^c$ and 116$^d$ pivoted on rod 118 and held from movement by work spindle housing 2 and sleeve 119 pinned on rod 118, Figs. 3, 18 and 19. By lifting these guards, the chucks can be opened and closed by hand with a suitable lever. Retainers 115$^a$ and 116$^a$ and guards 115$^d$ and 116$^d$ are in front and used for the chuck and feed thimble, respectively.

The swinging gage stop 120, Fig. 10, is clamped to and pivoted on a preferably hexagonally shaped shaft 121. By loosening clamp screws 120$^a$, the stop can be slid along shaft 121 for regulating length of stock feed. Another lever 122 located within cross slide housing 40 is pinned to this shaft 121. This lever has a projection 123 which extends in between two collars 124 of hydraulic piston 125. The piston thereby rotates the swinging gage stop into position for gaging the length of stock before index. It remains in position during index and returns out of the way of the tools after index and before any of the tools start forward.

The general cross slide arrangement eliminates levers, cams, overhang of slides and the accompanying vibration. It not only gives rigidity, ease of adjustment of tools, but also allows more light to reach the tools and better escape of the chips. There will also be little splash of cooling substance.

The pumps and work spindles are started and stopped by means of a push button 130 in front of the machine, Fig. 1. The movement of all slides and index of the machine is fully and conveniently controlled by feed valve 131 which is operated by handle 132.

The motor A, Fig. 2, drives through a chain belt 135, the change gear shaft and change gears 137 and 138 in turn drive the work spindles through center drive shaft 15 and any attachments through the gear 138$^a$ located next to driven change gear 138. The double pump B—C for the hydraulic circuit is directly driven by the motor A. The pump E (Fig. 3) for the cooling substance is driven through a chain 136. Both pumps and motor are mounted on a motor base 137 which is supported by two shafts or rods 158, Figs. 2, 3 and 6, which are held in bored holes in the bed casting. All piping is either inside of the bed or is eliminated by cored and drilled holes in the details. The cooling substance does not reach intake pipe of pump directly from chip space but must take a long path to opening 140, Fig. 3, at left end of bed and then back through passageway or conduit 141, Figs. 3 and 4, in bed, thereby allowing time for cooling substance to deposit the foreign matter held in suspension and to lose some of its heat before being used again.

The hydraulic circuit, Figs. 15, 15A and 15B, is of the orifice or lock circuit type which controls the return circuit and not the input. This makes for positive control overcoming the inertia of the parts, one of the important features of the circuit being the interlocking of all the hydraulic slides so that they are made to synchronize. This is done by preventing the starting of one set of operations before another is completed.

The indexing of the work spindle turret 13, the opening and closing of the chuck thimbles 25 and the feeding of the stock and the operation of the gage stop cannot take place until each and every tool slide has finished cutting and has returned out of the way of the work during index. This is obtained by running a pilot circuit I around through all the tool slides units.

The pilot circuit ports are not all open and no fluid can flow until all tool slides are back. This I-circuit controls the swinging gage stop and the index, the stock feed and the chuck operating mechanisms. Also the forward motion or cutting stroke for each and all tool slides is held back until the indexing is completed, stock is fed, the chuck closed and the gage stop removed. This is done by having all tool slides get their forwarding impulse from a common pilot circuit F.

No fluid will flow through this circuit F until index is completed and the chuck is closed and gage stop is swung out of the way. The above pilot circuits compel all units to synchronize. Another important feature is the means by which all tool slides are allowed to feed to a definite stop, dwell there until tools have completed their cut and only then to return. This is done by having the slide contact a positive stop and then using the reduced pressure on the throttle side or return side of each piston to actuate the return valve. This pressure is reduced because the slide in contacting with a positive stop will stop, hence no fluid will flow at the time through the throttle and hence no pressure drop at the throttle and return fluid side of the piston will be reduced to atmospheric pressure. This reduced pressure at one end of a return valve will allow the spring at the other end to shift the return valve, opening ports for rapid traversing the slide back into initial position where slide will wait until all slides are back and index is completed.

Referring to hydraulic circuit diagram, Figs. 15, 15A and 15B, it will be seen that all cross slide units are duplicates and are shown in the middle of the figure. In addition, all the cross slide units and both of the end working slides units are the same in principle. They function in the same manner. The index circuit only is different.

To make the circuit clear, heavy pressure is shown by heavy lines and atmospheric pressure by light lines. Also to clarify the sequence of operations, the cross slides in position p1, p2, p3 and p4 show respectively the major steps in the operation. These major steps are supplemented by those of the end working slides. All slides have these respective positions during the normal operation of the machine.

A description of the valves and pistons shown in Fig. 15A will now be given before tracing through the circuit. As explained before, all the tool slide units are similar. Each has a slide, as 70 or 90, for holding the tools, a piston as 5 or 91, (Figs. 3 and 12) to move the slide, a throttle valve as 104 to regulate the rate of travel of slide during the forward stroke. This is done by having a cam 103 on the slide which depresses valve 104, thus throttling flow of exhaust. Each unit also has a return valve as R—5 or R—90 to cause the slide to return after it has reached a positive stop. This return valve is actuated by a spring such as S5 or S90 in one direction and in the other by the hydraulic pressure in the exhaust side or throttle side of slide circuit. To complete the units each has a reversing valve as Rev. 5 or Rev. 90.

This reversing valve is a standard form of pilot operated spool valve. When it moves right, it passes the high pressure to the right end of slide piston and allows the exhaust at the left end of slide piston to escape to final exhaust.

The return valve R—5, as all other valves, is a spool valve. It is operated endwise by the pressure in the return circuit of the piston acting on lower end and by the spring RT acting at upper end in the diagram. It is seen that this valve has the form of a double spool, the upper spool opening and closing the main return circuit and the lower spool opening and closing reversing valve pilot circuit. It will be noticed that this return valve R—5 is controlled not only by return circuit pressure but also by high pressure from the throttle valve 104, Figs. 15A and 16.

The throttle valve 104 is also a slidable spool valve made up of four spools fastened end to end. The upper spool opens and closes the main return circuit. This main return circuit is shown closed in the main slide unit. On valve 104 the next lower spool position is the throttle. There are small V-notches ground in the periphery of the upper portion of this second spool. These V-notches are so made that sections of the valve taken at right angles to the axis will show a V-dent in the circumference of the valve, the higher the section the less indentation. In other words, the V becomes smaller as higher sections are taken. An annular groove in the valve cylinder wall serves as a port for the inlet of fluid under pressure during feed. Annular grooves are used as ports in all valve cylinders. The more the cam 103 depresses this valve, the smaller V-notch opening will be exposed to the circular port, hence the more the throttling effect.

By making the throttle valve and its cylinder of materials having dissimilar temperature coefficients, the V-notch opening will vary with the temperature, due to the dissimilar expansion of the valve and its cylinder. If the V-notch is of the right proportion, and the materials used have proper temperature coefficients for the hydraulic fluid employed, then the throttling effect will remain the same for the change in the viscosity of the fluid due to temperature change.

However, possibly a more practical construction is shown in Figs. 16 and 17, in which the valve 104 and its cylinder 104—C are made of similar materials and the whole is held by an outer sleeve 104—S which is of dissimilar material. The difference in the expansion between valve cylinder and its sleeve will in this case vary the throttle openings at V and hold the feed rate constant for any height of cam 103. The cam 103 lowers the valve 104 and opens and closes the throttle at V to give the desired rate of feed. The valve 104 is held up against the cam 103 by spring 104—Z at the lower end. When the cam is not in contact with the valve, then the spring 104—Z pushes the valve up until shoulder 104—A contacts with the bottom of the recess 104—B in cylinder 104—C. In this position the valve is in the rapid traverse position, as shown on hydraulic circuit, Figs. 15, 15A and 15B. The cylinder 104—C is held from end motion at its upper end by means of a nut 104—N which is threaded onto sleeve 104—S which holds the enlarged end of cylinder against the shoulder of the sleeve. The sleeve in turn is held against end motion at its lower end by means of nut 104—M which holds enlarged portion of sleeve against valve housing at 104—P. Many variations of this arrangement in which dissimilar materials are used can be substituted.

The fluid as it passes through this throttle loses its pressure and enters the spool proper, from which it is conducted by the next lower circular port to the exhaust. The third spool from the top opens and closes ports allowing some of the return circuit fluid to pass, when throttle valve is depressed, to the under end of return valve R—5 and when not depressed, the fourth spool opens ports allowing high pressure fluid from main supply to pass under return valve R—5 in order to hold return valve up, thus making the throttling action effective when the slide comes forward again and that is when cam 103 depresses through the valve again.

When this valve 104 is up, that is off the cam 103, the return fluid passes directly through circular ports in throttle valve cylinder walls to exhaust or low pressure side, giving a rapid traverse movement forward to slide. But when this valve is depressed, then the rapid traverse circuit or main circuit to exhaust line is closed and slide would stop if small amount were not allowed to reach the throttle. Before it reaches throttle, it passes through a regulating valve Reg—5, which is an automatic throttle ahead of the main throttle.

The purpose of this valve Reg—5 is to regulate the flow of fluid during the feed, or rate of feed for any given height of cam 103 or depression of throttle valve 104 when the load on the tool slide varies due to variation in the stock, or cutting edge of the tools. It is merely a throttle located on the end of the plunger which is raised by pressure in the return circuit and lowered by a spring above the plunger. There is a constant balance between the spring and the pressure under the piston of the plunger during normal rate of feed, but if tools become dull, there is a tendency toward lowering of pressure on return circuit and a slowing down in the rate of feed.

As this return fluid pressure lowers, the spring in the regulating throttle Reg—5 will open the regulating throttle and this will thereby reduce the throttling and allow the rate of flow to be constant.

The indexing, chucking, swinging gage step circuit unit is shown to the left of diagram, Fig. 15. It consists of a chuck operating piston 28 which pushes and pulls the chuck operating slide 27 which carries the index rack 27ª which enters into mesh with indexing gear 46 when chuck is opened, that is, when piston is moved to the right, and leaves indexing gear when chuck is closed, that is, when chuck slide is moved to the left.

This chuck piston 28 is operated by its reversing valve Rev—28, which is a standard spool form of pilot operated reversing valve, and is shifted for opening chuck only when all slides are back and gage stop is in position. Then only can it get high pressure to shift it to the left. It gets its pressure to move it to the right, as shown in Fig. 15, for closing chuck when and only when the indexing is completed, that is, when piston 48 has reached extreme rear position.

The indexing piston 48 moves an indexing slide 47 which carries the chuck operating slide 27 which carries indexing rack 27ª. Hence the cross movement of indexing piston causes a cross movement of index rack 27ª which rotates the indexing gear 46 and indexes the work turret 13 one position. This indexing piston 48 is controlled by its reversing valve Rev—48. This reversing valve Rev—48 is a standard spool pilot operated reversing valve and is controlled by the chuck piston 28. When chuck is closed at end of index, as shown on diagram Fig. 15, the high pressure passes to index piston reversing valve Rev—48 and shifts it as shown to the rear, allowing high pressure to get in the rear of indexing piston and propels it forward, as shown.

The swinging gage stop piston 125 is shown in Fig. 15A between the indexing piston 48 and the cross slide unit in position P2. It receives its high pressure for raising stop from the relay circuit I, or index relay circuit through which high pressure can reach the swinging gage stop only when all tool slides are back. When index piston 48 has returned to the rear or has completed index, high pressure from the chuck piston is allowed to flow around index piston 48 at rear end and to reach gage stop piston 125 through the port 125—F, causing the piston to go back and gage stop to lower.

In the diagram, the index is shown completed and the cross slide in the first position unit P1 is shown going forward in rapid traverse. The tool has not reached the work. The slide in the second position unit P2 is shown going forward in feed. Its tool is starting to cut and its cam 103 has contacted and depressed its throttle valve 104. The slide in the third position unit P3 has finished cutting and has reached the stop 101. Its exhaust pressure has dropped off to atmospheric pressure and its return valve R—90 has shifted opening ports for the reversal of its reversing valve Rev—90. When reversing valve Rev—90 has shifted, as shown in fourth position P4, slide will return as shown going back in rapid traverse. Also the main end working tool slide 70 is shown going forward in feed. Its cam 103 riding over its throttle valve 104, the slide is about through cutting.

The beginning of the whole general circuit is in the reservoir or tank. This fluid reservoir Z is located as shown in Fig. 1 to extend above any fluid connection of the machine and thereby insures against siphoning of the fluid out of the circuit which would permit air to enter the circuit. Air prevents accurate control. Connections are readily made fluid tight, but not air tight. In the diagram Fig. 15B at the right of the figure is the reservoir Z.

The motor A which drives the whole machine, and the rapid traverse and feed pump B and C respectively are shown with the line pressure control valve unit D in lower right hand side of Fig. 15B.

The large pump B is used for all rapid traverse movements. When the tools are cutting, the small pump C supplies all the fluid, the large pump B being by-passed by valve D¹ of unit D. This is done by the fluid in the high pressure line, shown by heavy lines, being admitted through port D—1a to underside of plunger of valve D—1, thus overcoming spring D—1b and causing the valve to open at D—1c and thus allowing fluid from large pump to by-pass into line Z—1, the high pressure fluid from small pump C being held back by check valve D—a.

If the feed of the whole machine is shut off by hand valve 131, shown just to the left of D, then pressure in the high pressure line rises sufficiently high to overcome spring D—3a in valve D—3 and small pump is also by-passed into the reservoir return line Z—1 through port D—3c. Hence as long as pumps are running, there is always fluid under pressure in high pressure lines. The valves D—1, D—2, and D—3 open and close to supply fluid under pressure to meet the demands of the machine.

To start the machine, the hand valve 131 is opened, such as at the beginning of the day, and thereafter the machine continues automatically to repeat its cycle of operation until this valve is closed again. This cycle comprises indexing the work pieces, advancing the tool slides to bring the tools into engagement with the respective work pieces and when the tools have completed their cutting, restoring the tool slides and the tools carried thereby to their normal position in readiness for the next cycle. In each cycle, the index slide moves to the right to advance the stock or work pieces as far as the stock gauge stop and rotates the stock turret to progressively step the pieces of stock therein into succeeding positions to be operated on by different tools carried on the tool slides. When the work has thus been indexed or positioned, a starting impulse of high pressure is simultaneously applied to the cross slides units P1, P2, P3, P4 as well as to the main tool slide unit T. It will be appreciated that all these tool slides units start their operations at the same time, but certain of these tools thereon will complete their operations before the others owing to the fact that they have a lesser distance to travel and less work to perform than the others. Each of the tool slides performs its work operation in four different stages and for convenience in description, the tool slide unit P1 is illustrated in the first stage where it is advancing toward the work in rapid traverse. Slide unit P2 is illustrated as having completed its rapid traverse stage and is shown in the feed stage in which the tool on the slide is performing its cutting operation. Slide unit P3 has completed both of these stages and is in the third stage where the tool is "dwelling," that is, the tool slide has stopped advancing and the tool is tapering off its cut, so that the tool will disengage the shaving from the work piece whereby in the next stage the tool can be withdrawn from this piece without breaking the cutting edge of the tool. The slide unit P4 is shown in the fourth stage wherein the tool slide is being withdrawn from the work and restored to its normal position where it waits until the work has been indexed again, and a starting impulse initiates the advance of the several tool slides in a manner to be described.

Referring now to slide unit P1 which is assumed to have received its starting impulse over the forwarding circuit F so that its reversing valve has been moved to the position shown, oil under high pressure is supplied through the supply conduit HP, through the passage 7' in the reversing valve Rev—90, conduit 8', to the rear of the advance piston 91 in the tool slide. Oil under high pressure thus supplied will advance this tool slide piston toward the work. High pressure oil is also supplied thru passage 6' in valve 104 to the lower end of the piston of return valve R90 causing it to hold its upper ports open. At this time, oil in the chamber 9' in front of the piston of the tool slide will exhaust rapidly through the conduit 10' and thence through the oil passage 11' in the throttling valve 104, conduit 12', oil passage 13' in the reversing valve and thence through the exhaust conduit F. EX to the oil reservoir Z at the extreme right in Fig. 15B.

Since the circuit first described permits a free flow of oil to the exhaust circuit, the motion of the piston slide 91 will not be retarded and it will advance rapidly in traverse to cause the tool slide to advance its tool rapidly toward the work piece. It will be understood that a movable cam 103 will be adjusted on its slide in such position with respect to the cam top of the valve 104 that just before the tool on this slide engages the work, the cam 103 will engage and move the valve 104 into a position where the flow of oil is retarded and the tool slide moves slowly during the cutting operation. This constitutes the feed stage of the slide. This stage is illustrated in slide unit P2. The high pressure oil is still supplied to the rear of the piston of the tool slide, through conduit 8' to cause the slide to advance toward the work. However, at this time, the flow of oil from the advance side of the piston through the conduit 10' is retarded since this oil passes through ports in 104C (Fig. 16) in the valve 104, thence through conduit 14', uniform pressure regulating valve Reg—T, conduit 15' and thence through the throttling V-shaped port V in the valve 104, conduits 16' and 17' and thence through the passage 18' in the reversing valve, conduit 19' to the main exhaust line F.EX. The V-shaped port V restricts the flow of oil from the advance side of the piston so that the piston advances slowly in this feed stage, that is during the tool cutting operation, until the slide engages the adjustable stop 101. During this feed stage, high pressure from the conduit 10' is supplied through the port 20', in the valve 104, thence through conduit 21' to the piston at the lower end of the return valve R90. This pressure overcomes the spring S90 so that the passage through the upper end of the return valve is still open at this time.

When the tool slide engages the stop 101, as shown in slide unit P3, the movement of the slide piston 91 will stop and the pressure of the oil in advance of this piston and in the conduits 10' and 21' as well as at the lower end of the return valve R90 will soon drop to zero. The spring S90 at the other end of the valve will start shifting the return valve as soon as this pressure starts to drop away. The interval during which the spring S90 is overcoming this reducing oil pressure at the other end of the return valve, permits the tool to "dwell," that is the tool slide after it engages the stop 101 will remain in that position for a brief interval giving the tool an opportunity to cut off the shaving from the work, that is clearing itself from the work.

As soon as the spring S90 in the return valve R90 has shifted this valve, the reversing valve will move to a position to open its ports as shown in slide unit P4 to effect the fourth stage of operation of each slide. There is an interval just after the reversing valve R90 has shifted and while the cam 103 is still holding the throttle valve 104 depressed, that is before the cam 103 has moved off the valve 104; in which interval the rapid return of the slide would be prevented if it were not for the passage 63' in the upper portion of R90. This passage completes a high pressure circuit thru passage 24' of the reversing valve Rev—90 which is now open (as shown in unit P4), conduit 26', passage 63' in the return valve R90 of unit P3 to the forward end of piston 90 before throttle valve is released. After valve 104 is released, return valve R90 is depressed by the high pressure admitted to the end thereof (as shown in unit P4) passage 64' at the end of throttle valve 104. Then oil under high pressure will be applied to the piston of the tool slide to restore it to its normal or inactive condition. This pressure is supplied from the main oil supply line, conduit 23', port 24', in the reversing valve, conduit 26', port 29' in the valve 104, conduit 30' to the rear of the piston of the slide 91 to cause it to return to its home position.

Thus after the completion of the several stages in the movements of each slide as just described, the cross slides units P1, P2, P3, P4 and T will be in their normal or home positions. When the slides have all been restored to this position, the machine is ready to effect its operation. In other words, proper synchronization is established so that the indexing operation can now be started without any danger of tool breakage since the tool slides are all out of the way and the work pieces being moved during the indexing operation, cannot break any of them.

The indexing operation is started at this time by reason of the fact that when the tool slide T and the other slides are in their home position, high pressure fluid is supplied through the reversing valve Rev—5, through ports 60' and 61', now open, in cylinder of the tool slide 5, to conduit 35' of the I circuit. Thus circuit is continued through the passage in piston 91 of tool slide unit P4 in its normal position, conduit 36' of the I circuit, thence through passage 37' in tool slide 91 of unit P3 in its normal position, conduit 38' of the index circuit through the passage 39' in tool slide 91 of unit P1, conduit 40' thence through the passage 41' open in tool slide 91 of unit P2, conduit 42', to the top of the swinging gauge stop piston 125. Oil under high pressure causes piston 125 to move forward thereby raising the work gauge stop and when this piston reaches the end of its stroke, it opens its port 125I. This extends the index circuit from conduit 42', port 125I, thence thru passage 48I in the index piston 48 and then thru conduits 43' and 44' to the right end of the chuck reversing valve Rev—28. High pressure oil in this circuit moves this reversing valve toward the left. In this new position of this valve, high pressure oil is supplied from main supply line, conduit 45', thru port 46' of this valve, conduit 47', to the advance side of the chuck piston 28. Piston 28 moves to the right to open the work chuck and causes the index rack 27a to mesh with index gear 46. When piston 28 has completed its stroke, port 28I in the cylinder of piston 28 will be open and high pressure oil in conduit 47' will be applied thru this port and conduit 49' to the upper end of the reversing valve Rev—48. This valve is thereby moved downward and supplies oil under high pressure thru conduit 50' and the passage in the reversing valve, conduit 51' to the lower side of the piston 48. Piston 48 is thus moved upward to index the work turret 13.

When piston 48 has completed its upward movement, the high pressure circuit is extended thru conduit 51', port 48C in the piston wall, conduit 52', to the left end of reversing valve piston Rev—28, thereby causing this piston to move to the right. With the reversing valve in this new position, high pressure oil is supplied through conduit 45', and the passage in this valve, conduit 53', to the right face of chuck piston 28. This causes piston 28 to move to the left to close the chuck. When piston 28 has completed its movement to the left, port 28F is opened in the cylinder wall of piston 28 allowing high pressure oil to flow thru conduit 54' and thru the passage 48F in the upper end of the cylinder wall of the piston 48, conduit 55', and then to the return side of the piston 125 of the stop gauge. This causes this piston to move toward the rear of the machine thereby lowering the stop gauge. Also high pressure oil in conduit 54' and branch conduit 55' is supplied to the lower end of the piston of reversing valve piston Rev—48, causing it to move to its upper position as shown in Fig. 15 in readiness to move forward ready for the next index operation.

When piston 125 is restored to its rear position, the high pressure tool starting circuit including conduit 54', passage 48F, conduit 55', passage 125FF in stop gauge piston 125, is extended over conduit F and the branch conduits connected thereto leading to each of the tool slide units P1, P2, P3, P4 and the main tool slide unit T. The starting impulse circuit F starts all of the tool slides simultaneously. The starting of all of the slides is effected in the same manner and it is necessary to describe only the starting of the slide unit P1 which is thus effected. The high pressure oil in main conduit F is extended through branch conduit 56', passage 57' in the tool slide piston, conduit 58', to the lower end of the reversing valve piston Rev—90. This moves the reversing valve of each slide to the position shown for slide unit P1 in Fig. 15A which completes the cycle of the control operations of the tool slides.

Hence it will be seen that the starting of the tool slides must await the completion of the indexing operation, before they can begin their cutting operation, and the tool slides must have completed their operation and must have returned to their normal position before the indexing operation can start thereby providing complete synchronization.

The above circuit is a positive hydraulic interlock and a solution to one of the major problems of applying hydraulic feeds to an automatic machine.

It will be obvious from the foregoing description and accompanying drawings that I have provided a novel multiple spindle and other fluid operated machines which are simple in operation and which will automatically operate. It is to be understood that the specific form of the various improved operative elements in the construction and operation of the machines, as specifically shown and described herein, is not restricted and that the invention contemplates many variations in the construction of such improved elements as may be made within the scope of the invention as defined by the following claims.

For example, the spirit of the invention will not be changed if the work turret is not indexed but merely the stock is fed out and the chucks opened and closed on all spindles instead of one, nor will the spirit of the invention be changed if more or less spindles are used.

If only one spindle is used and the main tool slide indexed instead of the work turret, we have a single spindle machine and the problems of interference remains. The solution as provided by this invention would be the same and therefore the spirit of the invention again remains the same.

I claim:

1. In a metal working machine comprising a bed and a rotatable work carrying cylinder including work holding means, the combination of fluid means for indexing said cylinder, a means for feeding work to said cylinder connected and movable with said indexing means, and a fluid means for operating said holding means, said plurality of fluid means being actuated by a common fluid system.

2. In a machine comprising a work carrying cylinder, the combination of fluid means for indexing said cylinder, an indexing gear fixed to said cylinder, an indexing slide having an indexing rack mounted thereupon, and a means for feeding work to said cylinder, which means is actuated by the movement of said indexing slide, said fluid means actuating said slide in synchronism with other functions of said machine.

3. In a machine comprising a rotatable work carrying cylinder having a clutching mechanism associated therewith and a plurality of work spindles, the combination of an indexing gear connected to said work carrying cylinder, an indexing slide having a gear rack to mesh with said indexing gear, a hydraulic means operating said clutching mechanism and causing a meshing of said indexing rack with said indexing gear, and a hydraulic means connected to said indexing slide whereby an indexing of the work carrying cylinder is made after the operating of said hydraulic means associated with said clutching mechanism.

4. In a hydraulically controlled machine, a source of pressure fluid, a plurality of tool slides, each provided with a cutting tool, a piston for each slide operable alternately to advance and to restore its slide, means including said source of fluid and said pistons operated from said source for advancing said slides individually to perform their cutting operations and for subsequently restoring said slides to their normal positions at the conclusion of said operations, work holding means provided with devices for rotating the work pieces during the cutting operations of said tools, indexing means operated from said source for progressively advancing work pieces into the path of said tools, and a circuit from said source controlled jointly by each of said tool slides in approximately their normal positions for initiating the operation of said indexing means.

5. In a hydraulically controlled tool machine, a source of pressure fluid, a plurality of tool slides, each provided with a cutting tool, a piston for each slide operable to advance and to restore its slide, means including said source of fluid and said pistons operated from said source for advancing said slides individually to perform their cutting operations and for subsequently restoring said slides to their normal position at the conclusion of said operations, work holding means provided with devices for rotating the work pieces during the cutting operations of said tools, indexing means operated from said source for progressively advancing work pieces into the path of said tools, and a series circuit completed from said source through each of said tool slides in their normal positions for initiating the operation of said index means.

6. In a hydraulically controlled tool machine, a source of pressure fluid, a plurality of tool slides, each provided with a cutting tool, a piston for each slide operable alternately to an advance position and to a normal position, means including said source of fluid and one of said pistons operated from said source for advancing each slide individually to perform its cutting operation and for subsequently restoring said slide to its normal position at the conclusion of the cutting operation, work holding means provided with devices for rotating the work pieces during the cutting operations of said tools, indexing means operated from said source for progressively advancing work pieces into the path of said tools, a circuit from said source controlled jointly by each of said tool slides in their normal positions for initiating the operation of said indexing means, and a circuit completed by said indexing means in its normal position for controlling the application of pressure fluid from said source to the piston of each of said slides for initiating the advance operation thereof.

7. In a hydraulically controlled tool machine, a source of pressure fluid, a plurality of tool slides, each provided with a cutting tool, a piston for each slide operable alternately to an advanced position and to a normal position, means including said source of fluid and said pistons operated from said source for advancing said slides individually to perform their cutting operations and for subsequently restoring said slides to their normal positions, work holding means provided with devices for rotating the work pieces during the cutting operations of said tools, indexing means operated from said source for progressively advancing work pieces into the path of said tools, a circuit from said source controlled jointly by each of said tool slides in their normal positions for initiating the operation of said indexing means, and a multiple circuit completed by said indexing means in its normal position for controlling the application of pressure fluid from said source to the pistons of said slides for initiating the advance operation thereof.

8. In a unit of a hydraulically operated tool machine, a source of pressure fluid, a tool slide provided with a cutting tool, a piston for moving said slide in one direction toward a cutting position and in the reverse direction from said cutting position to a normal position, said piston having fluid normally at the respective operating faces thereof, a reversing valve movable in response to pressure fluid applied to its respective faces to move said valve to either of two alternate positions to control the application of pressure fluid to the respective faces of said piston, means for applying pressure fluid to one face of said valve to move it to a position to control the application of pressure fluid to one face of said piston for advancing said slide to its work position, a throttle valve through which fluid in advance of said piston is exhausted, said valve being operated by said slide in its cutting position to reduce the rate of exhaust of the fluid in advance of said piston and therefore the rate of advancement of said slide, a stop for preventing the advance of said slide beyond a predetermined point and thereby reducing the pressure of the fluid in advance of said piston, a return valve actuated in response to a predetermined minimum pressure of the fluid in advance of said piston, means including said return valve for shifting said reversing valve to its alternate position, and means including said reversing valve in its new position to apply pressure fluid to the alternate face of said piston to restore it and its slide to its normal position.

9. In a unit of a hydraulically operated tool machine, a source of pressure fluid, a tool slide provided with a cutting tool, a piston for moving said slide in one direction toward a cutting position and in the reverse direction from said cutting position to a normal position, said piston having fluid normally at the respective faces of said piston, a reversing valve movable in response to pressure fluid alternately applied to its respective faces to move said valve to either of two alternate positions to control the application of pressure fluid to the respective faces of said piston, means for applying pressure fluid to one face of said valve to move it to a position to control the application of pressure fluid to one face of said piston for advancing said slide to its work position, means through which fluid in advance of said piston is exhausted, a stop for preventing the advance of said slide beyond a predetermined point and thereby reducing the pressure of the fluid in advance of said piston, a return valve actuated in response to a predetermined minimum pressure of the fluid in advance of said piston, means including said return valve for shifting said reversing valve to its alternate position, and means including said reversing valve in its new position to apply pressure fluid to the alternate face of said piston to restore it and its slide to its normal position.

10. In a unit of a hydraulically operated device, a movable member, a piston for moving said member, a reversing valve movable in response to high pressure fluid from a remote point for moving said valve to an alternate position, said valve in said position applying high pressure fluid to said piston for advancing said member toward a work position, a throttle valve operated by said member to reduce the rate of advancement of said member, a return valve actuated in response to the reduction of pressure fluid ahead of said piston, means including said return valve for shifting said reversing valve to its other position and means including said reversing valve in this new position for restoring said piston and its member to its normal position.

11. In a hydraulically operated device, a source of pressure fluid subject to changing viscosity due to temperature variations, at certain paths through which it passes, a movable member, a piston operated from said source for moving said member, and a throttling valve for controlling the rate of movement of said piston and member, said valve having a fixed part and a second part movable with respect to the other to provide a variable opening for the passage of said fluid therethrough, said parts being made of materials having different coefficients of expansion whereby said valve is compensated for temperature variations.

12. In a hydraulically operated device having a primary unit and a secondary unit, a movable member in each unit, a piston in each unit for advancing the movable member thereof to a work position and for restoring it to a normal position, a source of pressure fluid, each unit including a hydraulically operated reversing valve movable alternately to restoring and to advance positions to apply fluid from said source to effect the advance and restoration respectively of the piston in said unit, means responsive to the completion of the advance movement of the member in a given unit for applying said fluid to said reversing valve thereof to move it to its restoring position, means including said reversing valve in its restoring position for restoring the piston and the member associated therewith to its normal position and means controlled by said member in its normal position for applying said fluid to the reversing valve in the other unit to move it to its advance position whereby the primary unit after being started from the secondary unit, completes its cycle of operations and at the completion of its cycle of operations starts the cycle of operations of the secondary unit which in turn after the completion of its cycle starts the cycle of the primary unit to operate continuously and automatically in sequence.

13. In a hydraulically controlled tool mechine, a plurality of tool slides, actuating means for advancing all of said slides simultaneously for cutting operations, a source of fluid pressure, fluid pressure circuit means including said source actuated by said slides individually for operating said slide actuating means to terminate said operation of each slide and return the same to normal position, and fluid pressure circuit means actuated by said slides jointly on return to normal position, for operating said slide actuating means for advancing said slides to automatically repeat said operations in predetermined sequence.

14. In a hydraulically controlled tool machine, a plurality of tool slides, actuating means for advancing said slides for cutting operations, a source of fluid pressure, fluid pressure circuit means including said source actuated by said slides individually for operating said slide actuating means to terminate said operation of each slide and return the same to normal position, and fluid pressure circuit means including said source and connected with said slides in series for actuation thereby jointly on return of all said slides to normal position, for operating said slide actuating means to advance said slides and automatically repeat said cycle of operations in predetermined sequence.

15. In a hydraulically controlled tool machine, a plurality of tool slides, actuating means for advancing said slides for cutting operations, a source of fluid pressure, fluid pressure circuit means including said source connected in parallel with said slide actuating means for operating the same, fluid pressure circuit means including said source actuated by said slides individually for operating said slide actuating means to terminate said cutting operation of each slide and return the same to normal position, and fluid pressure circuit means actuated by said slides jointly on return to normal position for operating said slide actuating means for advancing said slides to automatically repeat said cycle of operations in predetermined sequence.

16. In a hydraulically controlled tool machine, a plurality of tool slides, a source of fluid pressure, fluid pressure circuit means including said source and connected in parallel with said slide actuating means for advancing said slides simultaneously for cutting operations, fluid pressure circuit means including said source actuated by said slides individually for operating said slide actuating means to terminate said operation of each slide and return the same to normal position, and other fluid pressure circuit means connected with said slides in series and actuated thereby jointly on return of all of said slides to normal position, for operating said first mentioned fluid pressure means and advancing said slides to automatically repeat said cycle of operations in predetermined sequence.

17. In a hydraulically controlled tool machine, work holding means, a plurality of tool slides, a source of fluid pressure, fluid pressure circuit means including said source for actuating said slides for cutting operations on the work, fluid pressure circuit means including said source actuated by said slides individually for operating said first mentioned circuit means for terminating the cutting operation of each slide and returning the same to normal position, fluid pressure circuit means actuated by said slides individually on return to normal position for operating said work holding means, and other fluid pressure means actuated by said work holding means for operating said first mentioned circuit means for advancing said slides to automatically repeat said cycle of operations in predetermined sequence.

18. In a hydraulically controlled tool machine, work holding means, a plurality of tool slides, a source of fluid pressure, fluid pressure circuit means including said source for actuating said slides for cutting operations on the work, fluid pressure circuit means including said source actuated by said slides individually for terminating said operation of each slide and returning the same to normal position, fluid pressure circuit means connected with said slides in series and actuated thereby jointly on return to normal position for operating said work holding means, and other fluid pressure circuit means actuated by said work holding means for operating said first mentioned fluid pressure means for advancing said slides to automatically repeat said cycle of operations in predetermined sequence.

19. In a hydraulically controlled tool machine, work holding means, work indexing means, a plurality of tool slides, a source of fluid pressure, fluid pressure means including said source connected in parallel with said slides for actuating the same for cutting operations, fluid pressure means including said source actuated by said slides individually to terminate said operation of each slide and return the same to normal position, and other fluid pressure means connected with said slides in series and actuated thereby jointly on return to normal position for operating said work indexing means, and means actuated by said indexing means for operating said first mentioned fluid pressure means to advance said slides and automatically repeat said cycle of operations in predetermined sequence.

20. In a hydraulically controlled tool machine, work feeding means, work indexing means, a plurality of tool slides, means for actuating said slides for cutting operations on the work, a source of fluid pressure, fluid pressure circuit means including said source actuated by said slides individually for operating said slide actuating means to terminate the cutting operation of each slide and return the same to normal position, fluid pressure circuit means including said source connected with said slides in series and with said work holding and indexing means for jointly operating the latter on return of all of said slides to normal position, and other fluid pressure circuit means actuated by said indexing means for operating said slide actuating means to advance said slides and automatically repeat said cycle of operations in predetermined sequence.

21. In a hydraulically controlled tool machine, work holding means, a tool slide, a source of fluid pressure, fluid pressure circuit means including said source for actuating said slide for cutting operation on the work, fluid pressure circuit means including said source actuated by said slide for operating said first mentioned circuit means for terminating the cutting operation of said slide and returning the same to normal position, fluid pressure circuit means actuated by said slide on return to normal position for operating said work holding means, and other fluid pressure means actuated by said work holding means for operating said first mentioned circuit means for advancing said slide to automatically repeat said cycle of operations in a predetermined sequence.

22. In a hydraulically controlled tool machine, a tool slide, actuating means for advancing said slide for cutting operation on the work, means for holding work pieces including means for rotating said pieces during the cutting operation of the tool thereon, means for indexing said work pieces toward and from said tool slide, a source of fluid pressure, fluid pressure circuit means including said source and actuated by said slide for operating said slide actuating means to terminate said operation of said slide and return the same to normal position, fluid pressure circuit means actuated by said slide on return to normal position for operating said indexing means, and fluid pressure circuit means actuated by said indexing means for operating said slide actuating means to advance said slide and automatically repeat said operations in predetermined sequence.

23. In a hydraulically controlled tool machine, a tool slide, actuating means for advancing said slide for cutting operation on the work, means for holding work pieces including means for feeding said pieces for cutting operation by the tool, means for indexing said work pieces toward and from said tool slide, a source of fluid pressure, fluid pressure circuit means including said source and actuated by said slide for operating said slide actuating means to terminate said operation of said slide and return the same to normal position, fluid pressure circuit means actuated by said slide on return to normal position for operating said work feeding and indexing means, and fluid pressure circuit means actuated by said work feeding and indexing means for operating said slide actuating means to advance said slide and automatically repeat said operations in predetermined sequence.

24. In a hydraulically controlled tool machine, a tool slide, actuating means for advancing said slide for cutting operation on the work, means for holding work pieces including means for feeding said pieces and for rotating the same during cutting operation of the tool, means for indexing said work pieces toward and from said slide, a source of fluid pressure, fluid pressure circuit means including said source and actuated by said slide for operating said slide actuating means to terminate said operation of said slide and return the same to normal position, fluid pressure circuit means actuated by said slide on return to normal position for operating said work feeding and indexing means, and fluid pressure circuit means actuated by said work feeding and indexing means for operating said slide actuating means to advance said slide and automatically repeat said operations in predetermined sequence.

25. In a hydraulically controlled tool machine, work feeding and rotating means, a tool slide, a source of fluid pressure, fluid pressure circuit means including said source for actuating said slide for cutting operation on the work, fluid pressure circuit means including said source actuated by said slide for operating said first mentioned circuit means for terminating the cutting operation of said slide and returning the same to normal position, fluid pressure circuit means actuated by said slide on return to normal position for operating said work feeding and rotating means, and other fluid pressure means actuated by said work feeding and rotating means for operating said first mentioned circuit means for advancing said slide to automatically repeat said cycle of operations in predetermined sequence.

26. In a hydraulically controlled tool machine, a plurality of tool slides, actuating means for advancing said slides simultaneously for cutting operations on the work, work holding means including means for feeding the work stock, means for indexing the work from tool to tool, a source of fluid pressure, fluid pressure circuit means including said source and actuated by said slides individually for operating said slide actuating means to terminate said operation of each slide and return the same to normal position, and fluid pressure circuit means actuated by said slides jointly on return to normal position for operating said work feeding and indexing means, and fluid pressure circuit means actuated by said work feeding and indexing means for operating said slide actuating means to advance said slides and automatically repeat said operations in predetermined sequence.

27. In a hydraulically controlled tool machine, a plurality of tool slides, actuating means for advancing said slides simultaneousy for cutting operations, work holding means including means for feeding the work and for rotating the same during said cutting operations of the tools, means for indexing the work from tool to tool, a source of fluid pressure, fluid pressure circuit means including said source and actuated by said slides individually for operating said slide actuating means to terminate said operation of each slide and return the same to normal position, and fluid pressure circuit means actuated by said slides jointly on return to normal position for operating said work feeding and indexing means, and fluid pressure circuit means actuated by said work feeding and indexing means for operating said slide actuating means to advance said slides and automatically repeat said operations in predetermined sequence.

28. In a hydraulically controlled tool machine, a plurality of tool slides, actuating means for advancing said slides substantially simutaneously for cutting operations on the work, work holding means including a spring collet for feeding the work, rotating clutch means for rotating the work during said cutting operations of the tools including means for releasing said clutch means during feeding of the work, means for indexing the work from tool to tool, a source of fluid pressure, fluid pressure circuit means including said source and actuated by said slides individually for operating said slide actuating means to terminate said operation of each slide and return the same to normal position, and fluid pressure circuit means actuated by said slides jointly on return to normal position for operating said work clutching means and said work feeding and indexing means, and fluid pressure circuit means actuated by one of said means after indexing for operating said slide actuating means to advance said slides and automatically repeat said operations in predetermined sequence.

29. In a hydraulically controlled tool machine, work carrying means comprising a plurality of work holding spindles for feeding, rotating, and indexing the work pieces, a plurality of tool supports, a source of fluid pressure, a fluid pressure circuit for advancing said tool supports for cutting operations on the work, fluid pressure circuits actuated by said tool supports individually for terminating the cutting operations and returning said tool supports to normal position, and a fluid pressure circuit actuated by said tool supports jointly on return to normal position for operating said work carrying means, said work carrying means having a connection with said first fluid pressure circuit for operating the same to advance said tool supports to automatically repeat said cycle of operations in a predetermined sequence.

30. In a hydraulically controlled tool machine, work carrying means comprising a plurality of work holding spindles for feeding, rotating, and indexing the work pieces and comprising a pair of relatively movable slides, a plurality of tool supports, a source of fluid pressure, a fluid pressure circuit actuated by one of said slides for advancing said tool supports for cutting operations on the work, fluid pressure circuits actuated by said tool supports individually for terminating said cutting operations and returning the same to normal position, and a fluid pressure circuit actuated by said tool supports jointly on return to normal position for operating said slides and actuating said first fluid pressure circuit for advancing said tool supports to automatically repeat said cycle of operations in a predetermined sequence.

31. In a metal working machine, the combination of a bed, a rotatable work holder, means for indexing said work holder, a single sliding tool carrier having a cylindrical surface portion concentric with the rotary axis of said work holder, tool holding means fixed on said cylindrical surface portion, and means for reciprocating said tool carrier.

32. In a metal working machine, the combination of a bed, a rotatable work holder having a bearing portion, means for indexing said work holder, a single sliding tool carrier having a bearing portion cooperating with the bearing portion of said work holder and an outer cylindrical surface portion concentric with said bearing portions, tool holding means fixed on said cylindrical surface portion, and means for reciprocating said tool carrier.

CYRUS MILBURN BOSWORTH.